United States Patent [19]

Rosa et al.

[11] 4,257,718

[45] Mar. 24, 1981

[54] SEMI-SUBMERSIBLE PIPELAYING CRAFT EQUIPPED FOR LAYING PIPES ON SEA BEDS, INCLUDING DEEP BEDS, AND THE METHOD OF OPERATION

[75] Inventors: Giovanni Rosa; Pasquale Brando, both of San Donato Milanese, Italy

[73] Assignee: Saipem, S.p.A., Milan, Italy

[21] Appl. No.: 922,201

[22] Filed: Jul. 6, 1978

[30] Foreign Application Priority Data

Dec. 27, 1977 [IT] Italy .............................. 31275 A/77

[51] Int. Cl.³ ........................................... B63B 35/04
[52] U.S. Cl. .................................. 405/167; 114/265; 405/166
[58] Field of Search ............................. 405/154–169; 114/264, 265; 175/7, 10; 235/150.27

[56] References Cited

U.S. PATENT DOCUMENTS

| | | | |
|---|---|---|---|
| Re. 29,478 | 11/1977 | Goren et al. | 405/205 |
| 2,921,442 | 1/1960 | Laborde et al. | 114/258 X |
| 3,576,977 | 5/1971 | Kolb | 405/166 X |
| 3,704,596 | 12/1972 | Lloyd | 405/166 |
| 3,990,259 | 11/1976 | Gunderson et al. | 405/166 |
| 4,091,760 | 5/1978 | Lloyd | 114/264 |

*Primary Examiner*—Dennis L. Taylor
*Attorney, Agent, or Firm*—Morgan, Finnegan, Pine, Foley & Lee

[57] ABSTRACT

A semi-submersible pipelaying watercraft is disclosed, which is particularly suitable for operating under particularly hostile marine environments, said watercraft comprising a composite ramp of special construction for launching the pipe to be laid, a system for determining the craft's position and a control system, governed by electronic computers for automatically positioning the craft.

An internal inclinable ramp is coactively combined with an external ramp and the internal ramp is equipped with a locking system and with a displacing system, hydraulic controls being provided for moving both the internal and external ramps. The electronic computers are two and one of them makes the calculations for determining the design parameters, whereas the other computer receives the actual data provided by the several sensors mounted aboard and processes them.

18 Claims, 39 Drawing Figures

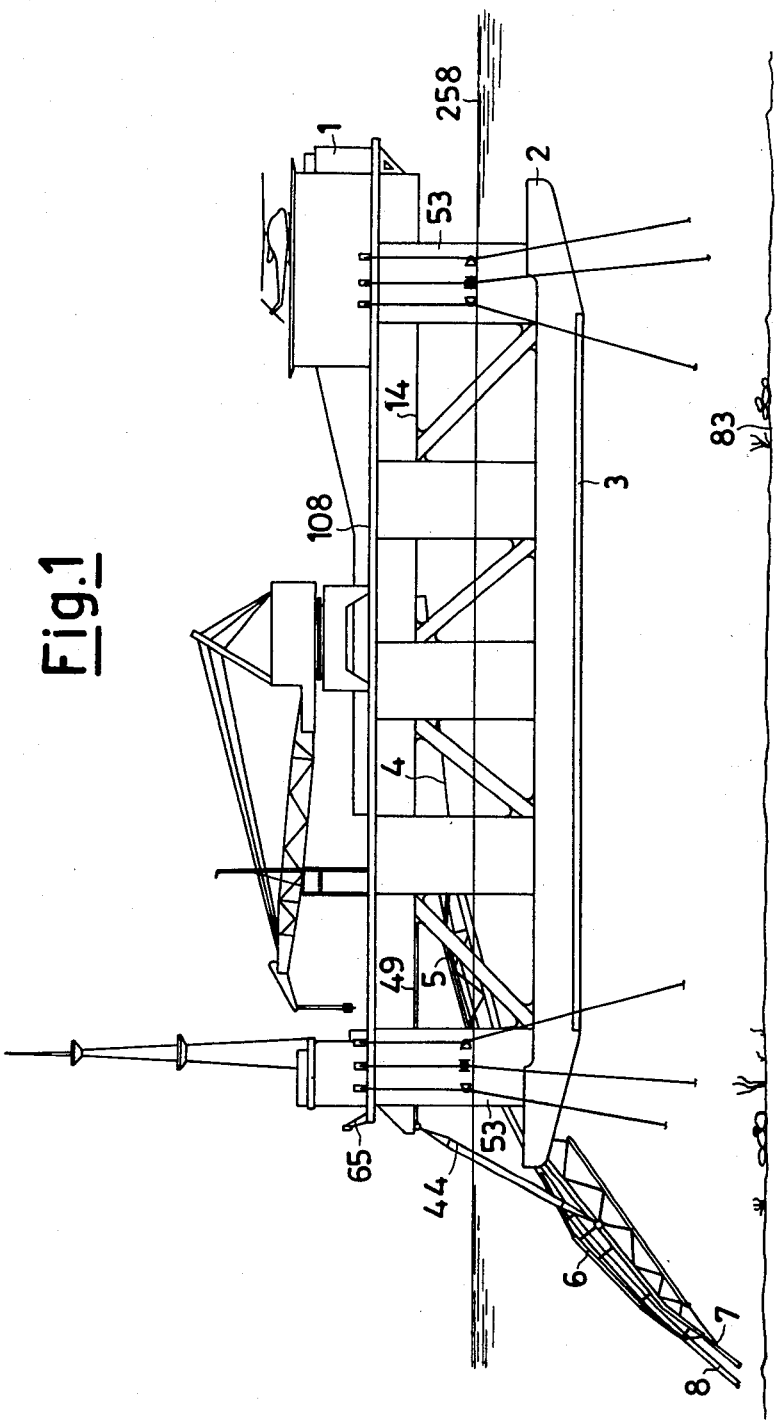

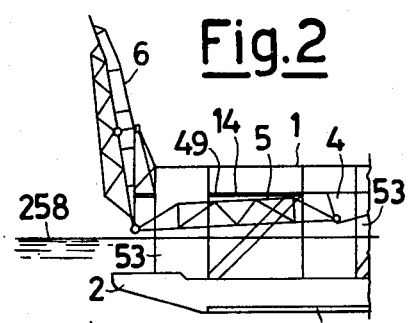
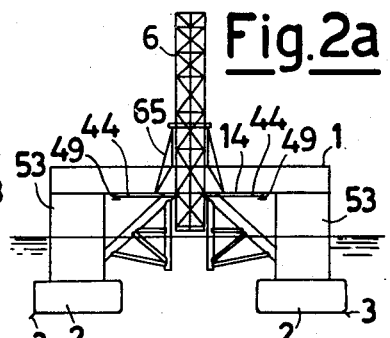
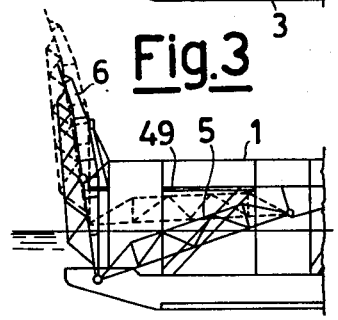
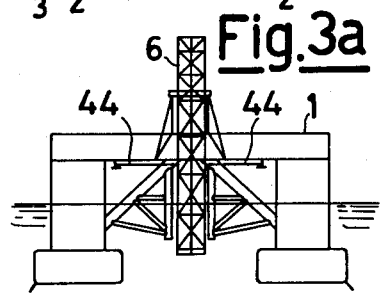
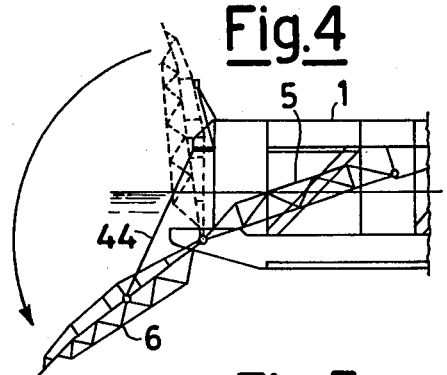
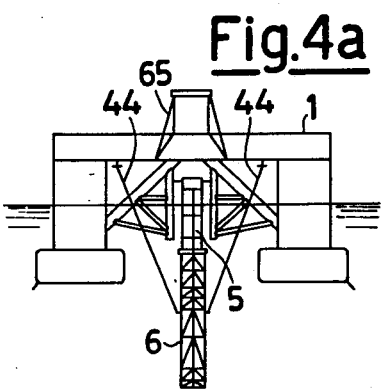
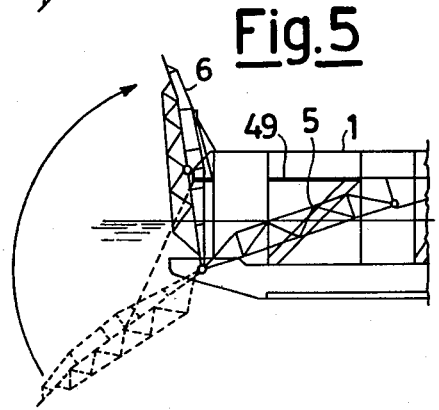
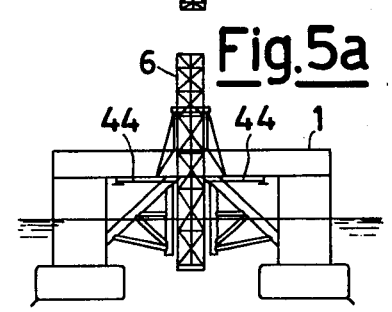

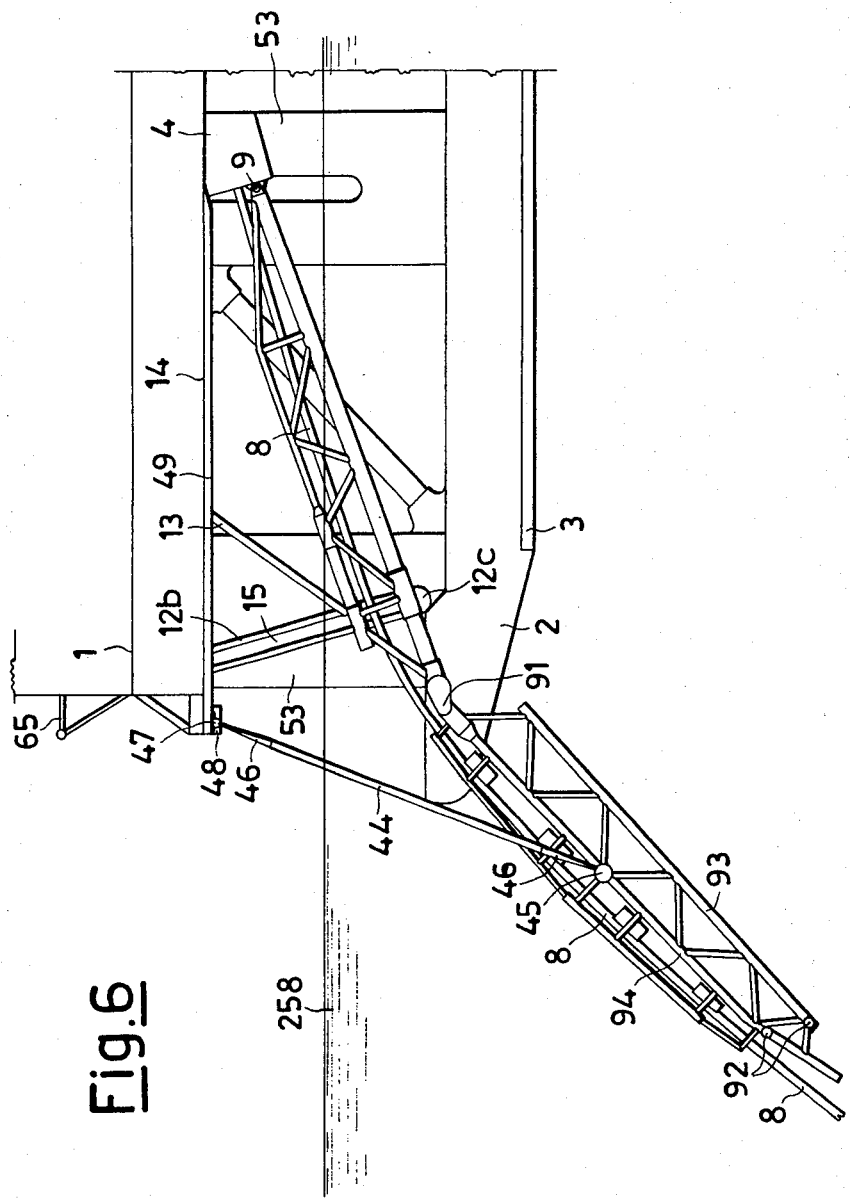

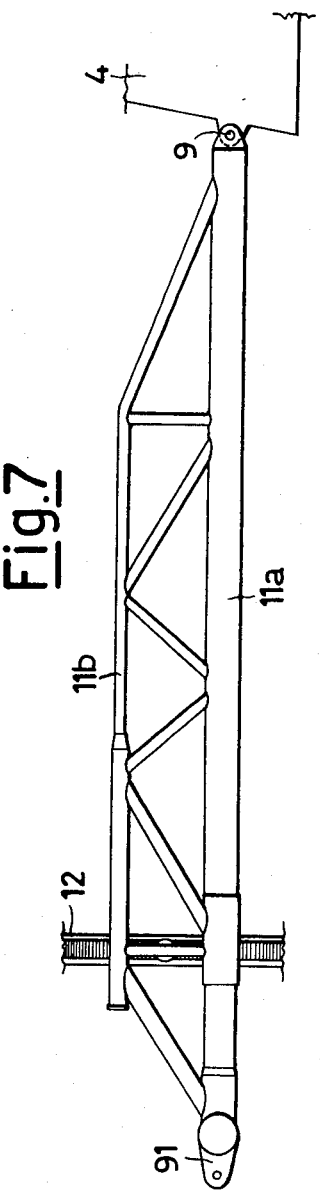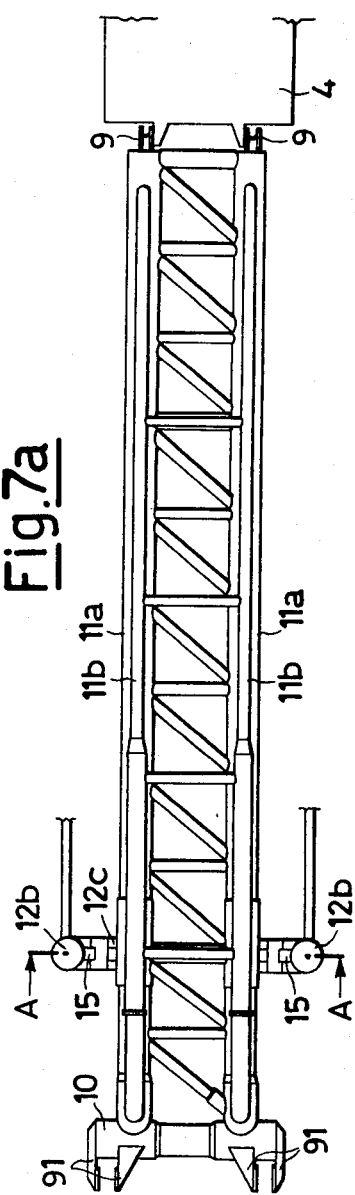

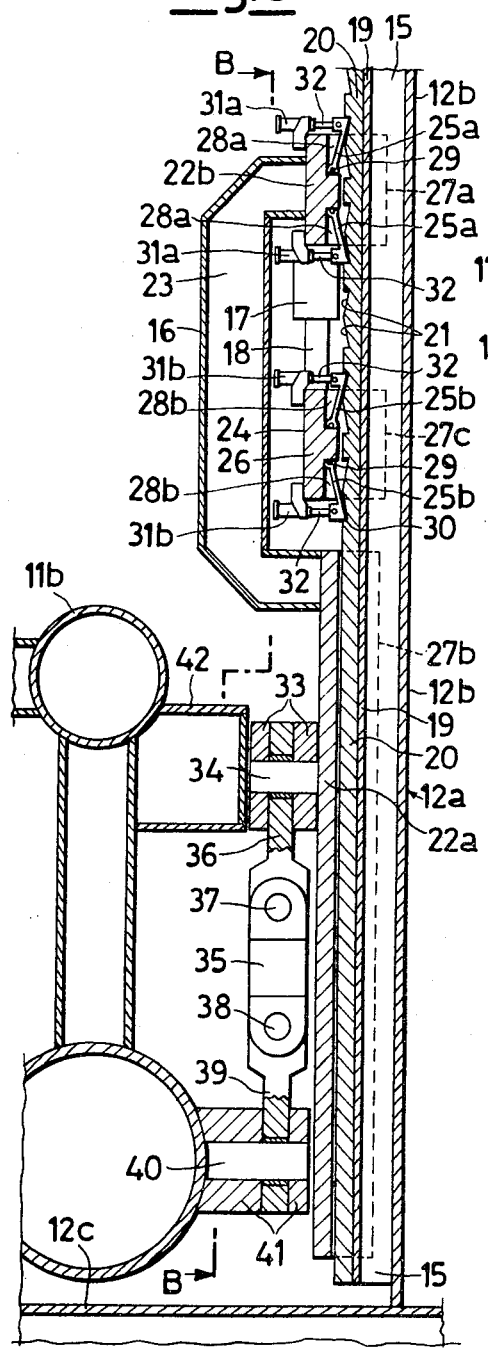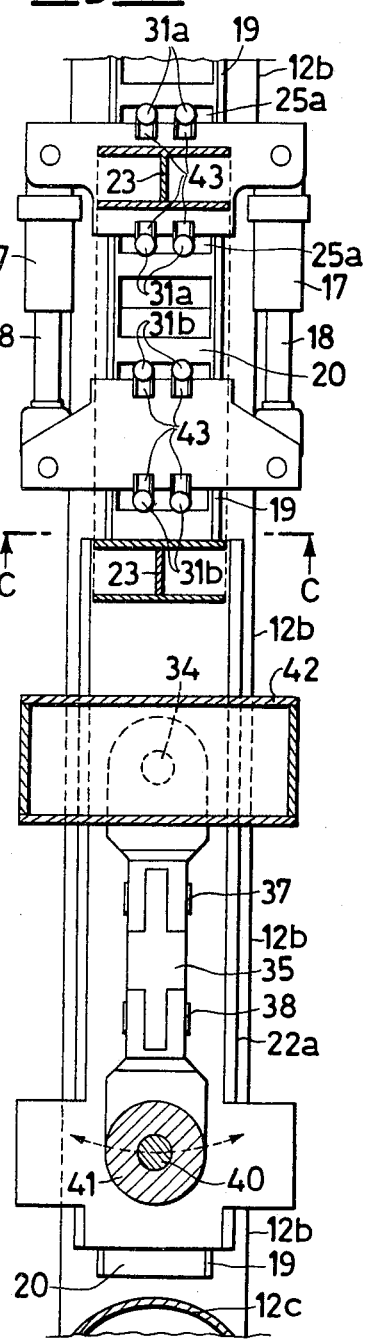

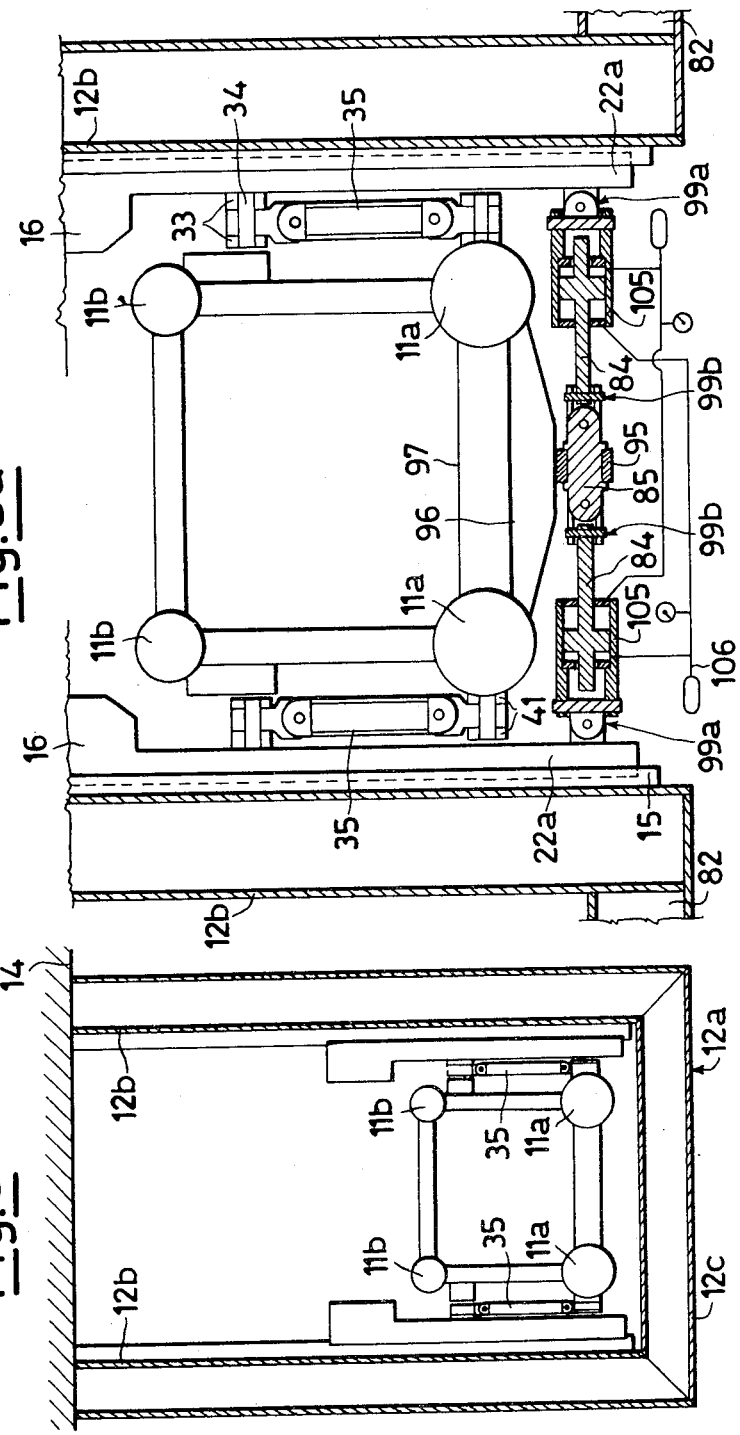

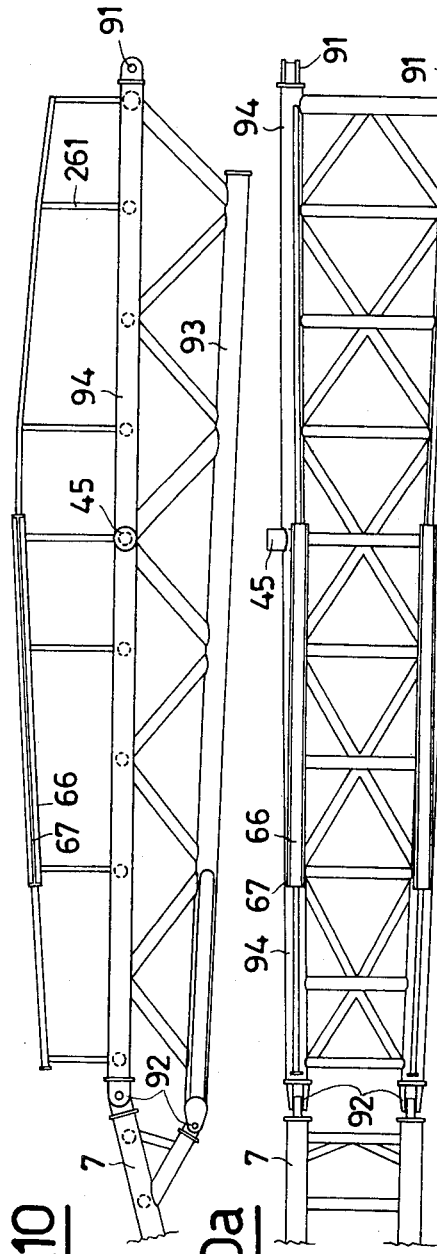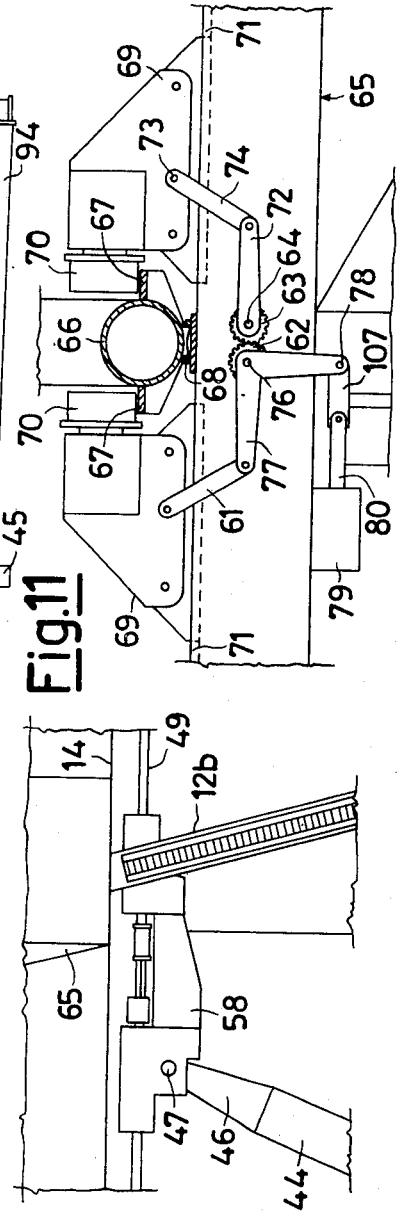

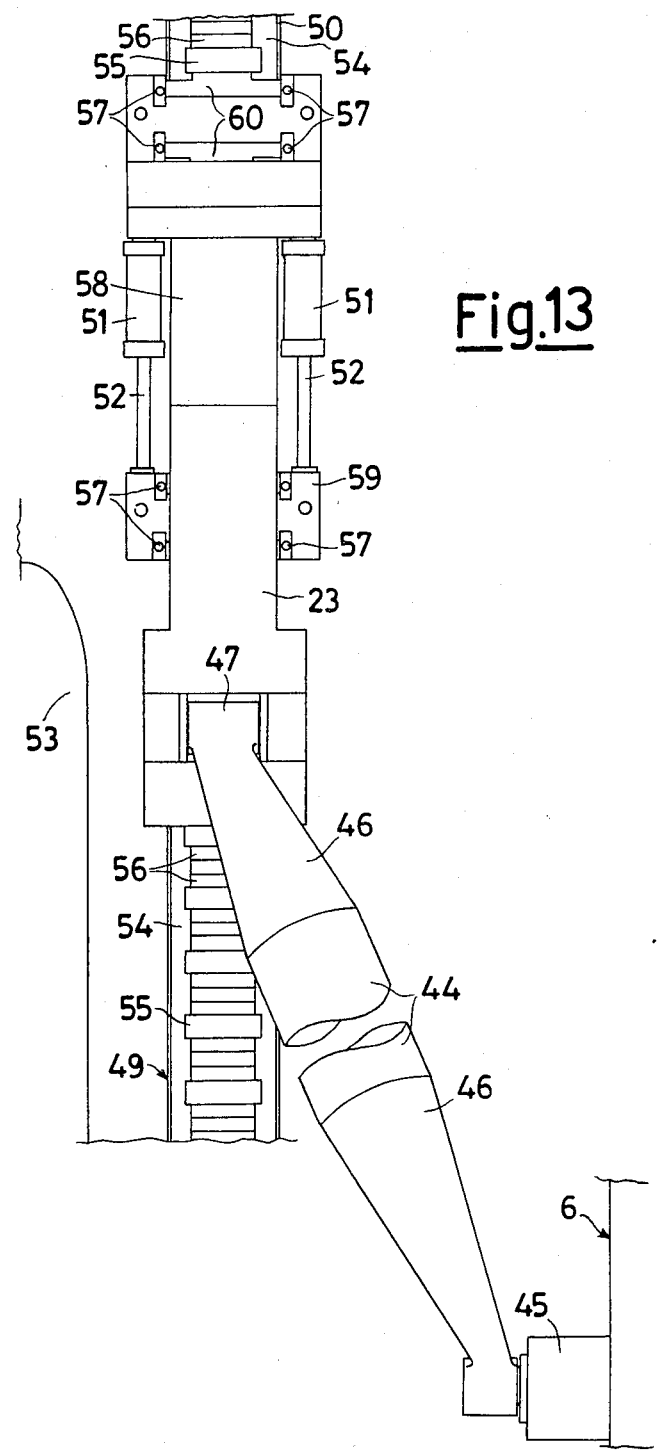

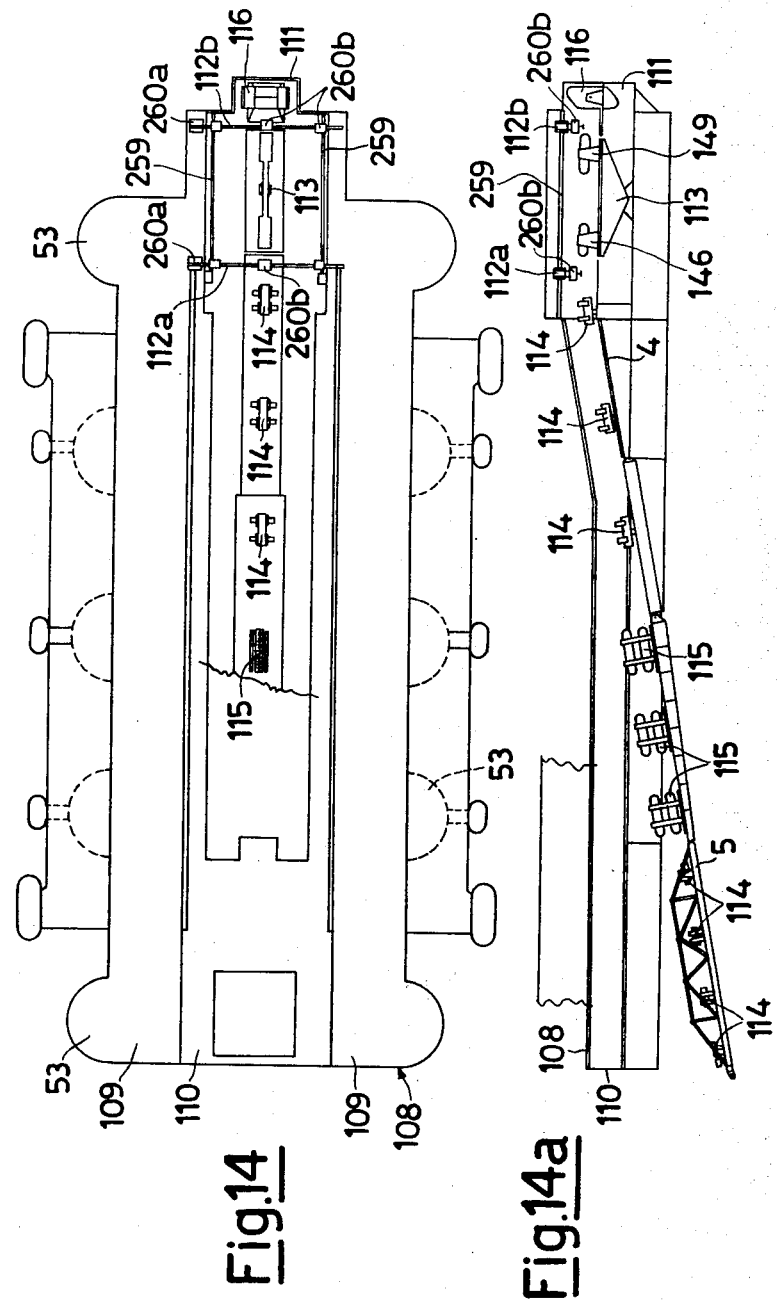

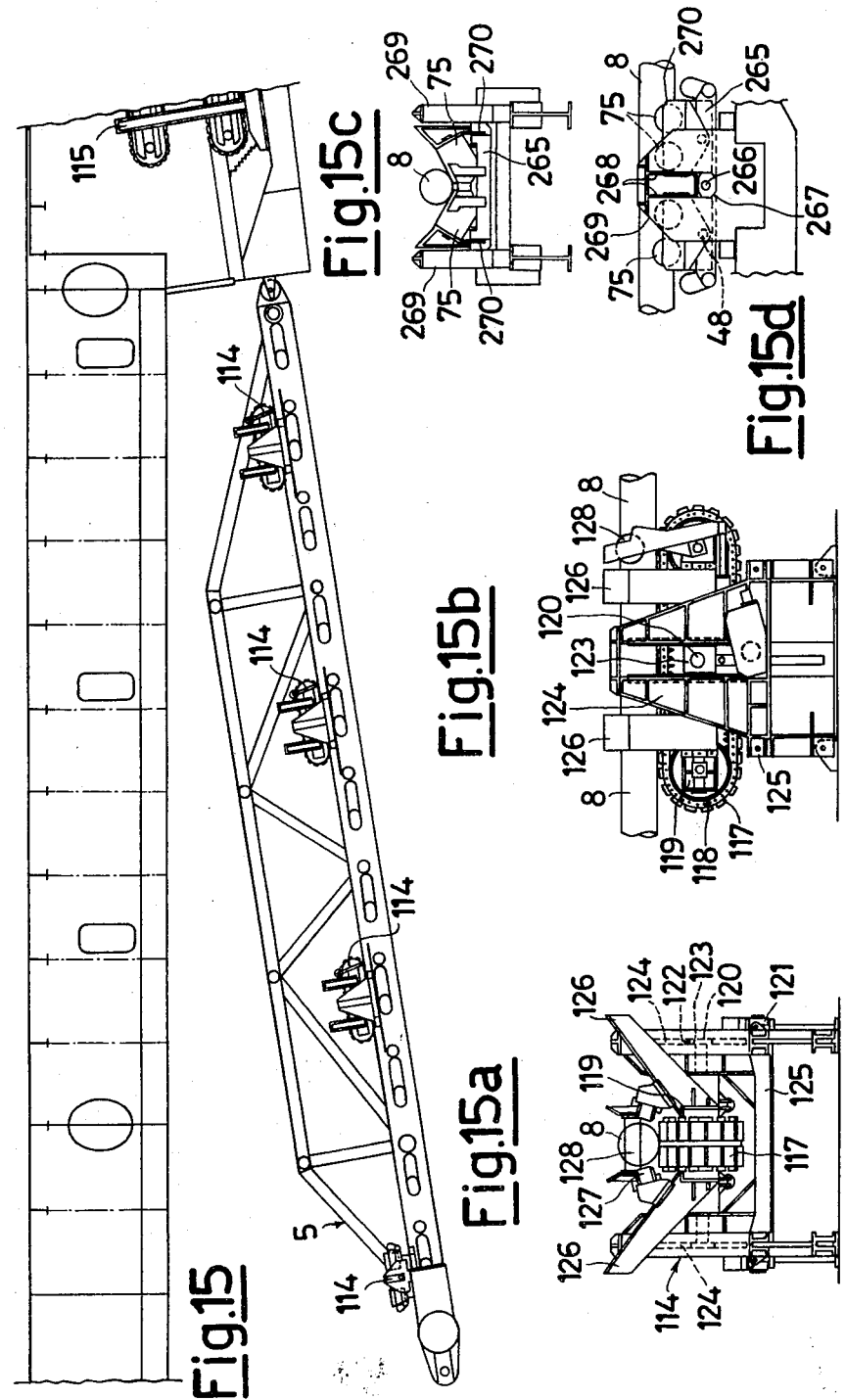

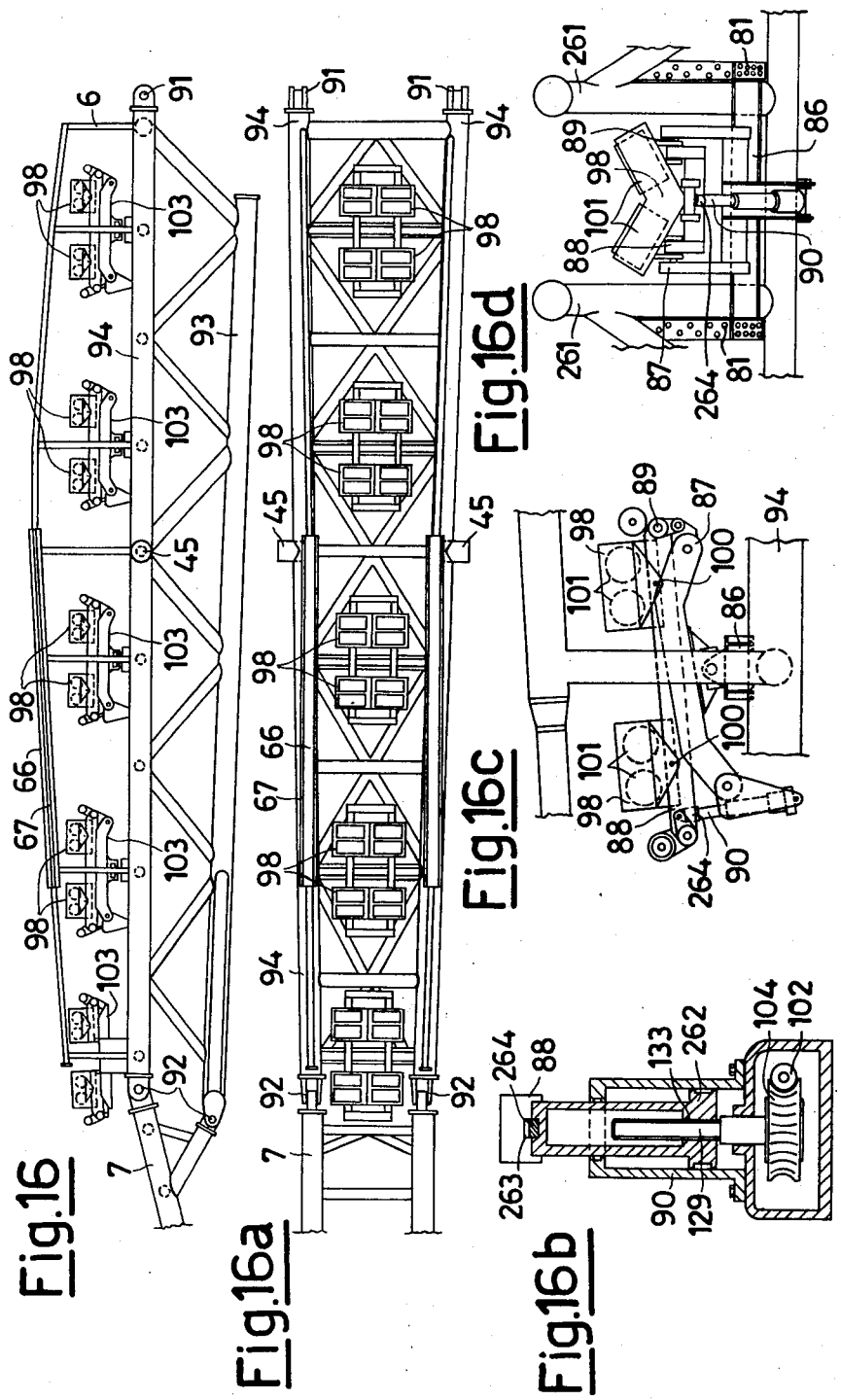

SEMI-SUBMERSIBLE PIPELAYING CRAFT EQUIPPED FOR LAYING PIPES ON SEA BEDS, INCLUDING DEEP BEDS, AND THE METHOD OF OPERATION

This invention relates to a semi-submersible pipelaying sea craft which, playing a principle part within a general system of craft used for constructing an underwater pipeline, lays the pipe with high technical and economical efficiency, even at great depths and under difficult sea conditions, by using a composite ramp for launching the pipe, a mixed system for determining the craft's position, and a control system using electronic computers for automatically positioning the sea craft.

The laying of a pipe generally takes a long time, and this means that the operation can be influenced by changes in sea conditions, which can often interrupt it.

It is therefore necessary for the laying operation to proceed swiftly, and, except for cases of extremely adverse sea conditions, it is very advantageous economically if bad weather does not compel the ship used for the laying operation to leave the place in which the operation is carried out in order to shelter in less agitated water.

Consequently, it is necessary for the equipment used for the laying operation to be able to carry out particularly arduous tasks by means of easy, reliable and rapid handling operations. The known equipment for pipelaying is not such as to enable the craft used for the laying to remain in its position at the place in which the laying is carried out, so resulting in frequent interruptions in the laying operation and requiring the craft to leave the zone of operation even when the sea conditions are not particularly adverse.

In this respect, various known types of equipment are able to be used in the pipelaying operation by hinging a tower framework to the stern of the laying craft, so that it accompanies the descent of the pipe from the upper deck of the laying craft as far as the level of the sea, from whence the pipe is able to descend to the sea bed via an articulated ramp, also known as a "stinger", which is provided with suitable floats to give support along the line configured by the pipe to be layed.

When these tower frameworks and the craft to which they are connected are subjected to adverse sea conditions, they unload the resultants of the forces and moments on to the connection hinge, which represents the weak point of the construction and which is frequently fractured so that the laying operation has to be interrupted in order to repair the damage. In addition, in a strongly agitated sea the laying craft, after releasing the pipe, is required to confront adverse sea conditions which are aggravated by the fact that the framework connected to the stern is now freed from the pipe and because of this is even more subject to movement due to the conditions of the sea, which cause such stresses to be applied to the connection hinges as to require the laying craft either to abandon the framework, an operation which is always risky, or to seek shelter by leaving the place of the laying operation, with the framework being towed along and at the complete mercy of the waves.

Other known pipelaying constructions are characterised by forming a long fixed arc which accompanies the pipe from the upper deck of the laying craft as far as the level of the sea, from whence the pipe can be further accompanied by an articulated ramp (stinger). However, this arc is subjected, over the entire portion poised above the level of the sea, to adverse meteorological conditions and especially to impact by waves which can easily seriously damage the arc construction.

Again, in determining the position of the craft used for pipelaying, known apparatus based only on radio navigation are not sufficient to accurately determine the position of the craft, particularly during certain periods of the day and in sea locations distant from the coast.

In addition, in positioning the craft above deep beds, known apparatus do not take into account various phenomena which occur during the laying of the pipe, including the negative effects on the tensioning devices and winches of the laying craft caused by point loads arising both from the oscillation of the pipe and cables respectively during warping, and of the rapid increase in the tension in the pipe and cables respectively, caused by the friction of the pipe and cables on the sea bed during the drift movements of the craft. Amongst other things, known apparatus do not provide the sea craft with the optimum position to be assumed in the light of any adversities in the environment in which it operates, so that the pipe lies on the sea bed along the required line.

The object of the present invention is therefore to eliminate the aforesaid and other drawbacks and to provide various pipelaying apparatus, including an particulated or composite launching ramp, which allows effective reliable pipelaying on even deep sea beds, and which in addition, under the so-called "survival" situation in particularly adverse sea conditions, enables the laying craft to reman in situ after releasing the pipe, without the mobile ramps having to be abandoned, so facilitating and accelerating the re-commencement of pipe launching operations.

According to one characteristic of the present invention, said composite ramp is constituted by an internal inclinable ramp, hinged to the end of the fixed inclined launching ramp of a pipelaying craft, similar to that of Italian Pat. No. 993,598. To the other end of said internal ramp there is hinged an external ramp which can be inclined such that for laying the pipe it assumes, in accordance with the angle established for the internal ramp, an angle such as to obtain an optimum configuration of the longitudinal axis of the pipe to be laid which is mainly dictated by the sea depth, and which can also be rotated upwards so as to be able to be raised from the surface of the sea when its conditions are particularly adverse and the pipe has to be abandoned, so that the laying craft is then in the so-called survival condition, and the external ramp assumes an almost vertical position which preserves it from the damage which the sea waves could cause. The internal ramp hinged both to the fixed ramp and external ramp is provided with means which form a system of connection, locking and movement within a range of positions corresponding to predetermined optical inclinations for the laying operations. The external ramp, connected at one end to the internal ramp and at the other to a possible articulated ramp (stinger), is provided with an assembly of connection, locking and movement means to effect a range of scheduled positions representing both operational positions for the laying, and in situ survival positions for the craft after abandoning the pipe. The controls for said ramps are arranged on the control bridge of the laying craft.

According to the present invention, said internal ramp is constituted by a closed framework formed from two lower main longitudinal beams of circular cross-section connected together by cross-members which support the respective pipe portion by roller and tracked rocker cradles. Said longitudinal members are connected by uprights and diagonals to two further upper longitudinal members, connected together by cross-members, to form a high-strength closed framework able to contain, by way of said rocker cradles, the lateral forces and bending and twisting moments induced by the supported pipe portion.

In addition, said internal ramp is provided at one end of the lower longitudinal members with connection flanges bored to take the pins used for fixing it to the fixed launching ramp of the laying craft, and is fitted at the other end with a transverse beam of circular cross-section which is also provided with flanges for its connection to the external ramp. In addition to said hinges for connecting it to the fixed ramp and external ramp, said connection means for the internal ramp also comprise an inverted portal fixed upperly to the soffit of the upper deck of the laying craft. Said portal is contained in a plane inclined to the vertical in order to compensate for the displacements of the rotating end of the internal ramp from the chord of the circular arc which said ramp describes in its various launching positions. Said portal is fitted along each of the two inner sides of the two inclined uprights of circular cross-section which comprise it, with a guide rail of box structure provided with a plate on which a rack is mounted, said plate defining with its two edges two guide flanges along which can slide a main carriage which is constituted at its top by a plate which embraces said guide flanges, and at its bottom by another embracing plate, and in its intermediate part by a bridge plate connecting together said plates. The internal ramp is connected to the two main carriages sliding inside the uprights of the portal, by means of two connecting rods comprising two articulated joints, and which at their upper ends are pivoted on pins fixed to the two main carriages, and at their lower ends are pivoted on pins fixed to the two lower longitudinal members of the ramp itself, so that this latter can swivel longitudinally about the pins fixed to the two main carriages, and transversely about the articulated joints of the two connecting rods.

According to one modification of the preceding characteristic, in addition to said hinges for connection to the fixed ramp and external ramp, the means for connecting the internal ramp to the laying craft also comprise, instead of said inverted portal, two inclined uprights of circular cross-section fitted with the same connection means as described in the preceding characteristic, but without the horizontal beam. Said uprights, instead of being connected together in the manner of a portal by the lower horizontal beam, are connected externally by horizontal beams to the lateral keels of the laying craft, and are connected together internally by a connection system composed of two rods which are connected at one end to the pistons of two hydraulic cylinders, hinged by universal joints to the main carriages sliding inside the two inclined uprights, and at the other end, by means of articulated or universal joints, to an axle connected to the centre of the lower chord of the ramp. Said hydraulic cylinders are connected together by pipes so that when one piston moves for example towards the left, the other piston is urged to the right by the fluid contained in the cylinders. In this manner, the longitudinal axis of the ramp is compelled to keep the same distance from the inclined uprights, while the said system also opposes the horizontal thrusts which the ramp imposes on the inclined uprights.

According to a further characteristic of the invention, the means for locking the internal ramp consist of a fixing system fitted on said upper embracing plate of each main carriage, and composed of four small hydraulic cylinders disposed in pairs along the upper and lower edges of said plate, and which, when controlled, act by way of a rod connected to their piston on two small rectangular coupling plates hinged on one of their sides to the upper embracing plate, and mobile along their other side when controlled by said rods, so that they are able, when controlled, to become inserted in or withdraw from special cavities provided in said rack fixed to the rail plate of each inclined upright of the inverted portal. Thus, following a given control signal, said small rectangular plates are thrust on one of their sides by the rods of the small hydraulic cylinders so that they become inserted into the cavities in the rack, and thus lock the main carriage in a predetermined position, so that said internal ramp, hinged at one end to the fixed ramp and supported at the other end by the main carriage by way of said connecting rods, is locked in the required inclined position for launching the pipe.

A further characteristic of the invention is represented by said means for moving said internal ramp, and which consist of a secondary carriage, coupled to each main carriage and situated between said bridge plate of the main carriage and said rack, and composed of a plate embracing the guide rail, four small hydraulic cylinders disposed in pairs along the upper and lower edges of the embracing plate, as in the case of the upper plate of the main carriage, and acting on two small rectangular plates similar to those disposed on the upper plate of the main carriage, and two double acting hydraulic cylinders (actuator cylinders), the upper end of which is hinged to the upper plate of the main carriage, the lower end of the piston rod being hinged to the plate of the secondary carriage. In this manner, in order to move the internal ramp upwards, this ramp being connected to the main carriages by said two connecting rods, the procedure is as follows. The plates of the secondary carriages are fixed to the racks by inserting the small plates operated by the small hydraulic cylinders into the rack cavities, after which, following a further control signal, the small cylinders act to extract the small plates of the upper plates of the main carriage from the cavities, so that the main carriages are free on the racks. When a further control signal is received, the actuator cylinders are activated and push their piston rods against the secondary carriages already fixed on the racks, so pushing upwards with their other end the upper plates of the main carriages to which they are hinged. Said carriages slide on the racks to displace, in the same direction, the pins on which the connecting rods are hinged, so raising the internal ramp of the arc corresponding to the portion travelled by the main carriages. After the rods of the actuator cylinders have extended to their maximum amount, the upper plates of the main carriages are fixed to the racks by inserting the small plates in the cavities. The secondary carriages, released from the racks, are then raised by the actuator cylinders and again fixed to the racks by inserting the small plates again, and the raising operation commences again until the mobile end of the internal ramp is raised to the required height.

The free end of the internal ramp is moved downwards by the same operations in the reverse sequence.

According to a further characteristic of the invention, said external ramp is constituted by a closed framework formed from one or two lower longitudinal members and two upper longitudinal members connected together by cross-members, uprights and diagonals which support the roller or tracked rocker cradles on which the pipe to be laid rests.

In addition, two tubular guides provided with lateral flanges are mounted on the upper longitudinal members, and two hinges connect said external ramp by way of two support arms to two further hinges disposed on two main carriages slidable on two guide rails of box structure mounted on the soffit of the deck of the pipelaying craft.

Said external ramp is also connected at one end to the internal ramp via two hinges, and at the other end can be connected to an articulated ramp or extension (stinger) by two upper hinges and two lower hinges. The entire assembly thus constitutes a closed framework which can rotate on said pins connecting it to the internal ramp to assume the various configurations required in laying the pipe.

In addition to said hinges connecting the external ramp to the internal ramp and possibly to the articulated ramp, said connection, locking and movement means for the external ramp also comprise said tubular arms which connect the external ramp to said carriages sliding on the rails of the soffit. At one end, said arms are tapered and hinged to the centre of the ramp, and at the other end, which is also tapered, they are hinged to two sliding apparatus each constituted by a main carriage and a secondary carriage similar to those already described for moving the internal ramp on the guide rails of the inverted portal. Thus, after carrying out the various operations already described for the internal ramp, said carriages are fixed to the rails in the required positions to give the ramp the required inclination.

According to a further characteristic of the invention, the said two tubular guides mounted on the upper longitudinal members of the external ramp, and provided with lateral flanges, enable a central portion of the external ramp to be coupled to a special support tower disposed on the deck towards the stern of the laying craft, when, after adverse sea conditions have caused the abandonment of the pipe and the separation of the stinger, said external ramp is raised to assume an almost vertical position above the sea by pulling the two arms pivoted to its centre by operating the actuator cylinders for the carriages which slide on the rails of the bridge soffit. The external ramp can thus be sheltered from impact with the waves in a storm. Said almost vertical position, which distinguishes the so-called survival situation of the laying craft, is then secured by fixing the external ramp to said support tower by operating two double acting hydraulic cylinders which, by way of special lever mechanisms, act on slides which by approaching the flanges of the two tubular guides of the external ramp clamp said flanges to said tower, so perfectly fixing the external ramp to the pipelaying craft.

Furthermore, if the craft should have to abandon the operating position because of worsening sea conditions or because the work has finished, the external ramp, already fixed to the tower in the previously described manner, can be further raised by moving the main and secondary carriages fitted to the inclined uprights already supporting the end of the internal ramp, after removing the arm which connect the external ramp to the carriages which slide on the rails of the soffit of the deck of the laying craft. This movement is aided by the rotation of rollers mounted on said slides of said support tower, these rollers rotating on said lateral flanges of the guide to give the external ramp the necessary and continuous support for its stability during its rising movement.

Said movements take place in the reverse direction when said external ramp has to be lowered from its highest position after the laying craft has again reached its operating position for initiating the laying work.

According to a further characteristic of the invention, all the controls for moving the internal and external ramps are hydraulic, and are provided with solenoid valves operated by pushbuttons, and derive from a single central unit arranged on the control pulpit.

The relative positions of all the main and secondary carriages during their stroke are controlled by a hydraulic feeder which feeds the necessary oil in the predetermined quantity to give synchronous movements. If the various set movement stages of the ramps during the raising or lowering cycle are not carried out correctly, a safety system, which will not be further specified, is provided so that the control signals fed are not acted upon, and the ramps remain immobile. In addition, the system for locking the main and secondary carriages is irreversible, so that the ramps remain immobile if there is a deficiency of oil in the central hydraulic units. In addition a safety system acts such that it is impossible to turn the internal ramp through an angle simultaneously with the external ramp.

According to a further characteristic of the present invention, the horizontal swivel system, which serves for aligning the pipe portion to be welded-on with the pipe being laid and for bringing it close thereto, is formed from a central triangular fixed base anchored to the bridge of the laying craft; in its upper vertex there is provided a pivot about which can rotate two triangular structures, one situated towards the tensioning devices and the other towards the winch for pulling the cable connected to the head of the pipe to be laid. These structures are positioned in such a manner that their major side is positioned at the top, and their lower vertices are connected together by a double acting hydraulic cylinder. The triangular structures thus disposed form a horizontal platform, and its two ends are connected to the craft bridge by two double acting hydraulic cylinders. At that end of the horizontal platform facing the tensioning devices there is provided a rocker track elevator, and at the other end facing the winch there is provided a motorised track elevator, the tracking of which, mobile in both directions by means of a hydraulic motor with a reduction unit, is supported by a frame which can be rotated through a few degrees when controlled to do so by means of a screw and lead nut, the centre of which is pivoted on a column displaceable vertically by the action of a double acting hydraulic cylinder, and rotatable on a support base which can slide in both directions longitudinally and transversely to the laying craft, to align the pipe portion with the head of the pipe to be laid. The system just described consisting of the two track elevators and horizontal platform operates in the following manner: if double jointed pipe portions are to be loaded, these are rested on the tracks of the two elevators disposed in a horizontal position; the platform on which the two elevators are supported is then inclined in line with the fixed laying ramp by operating one of the two hydraulic cylinders disposed at the platform ends. If a single pipe portion is to be loaded, the triangular structure which faces the tensioning devices and is fitted with the rocker track elevator remains constantly inclined in line with the fixed ramp, while the single pipe portion is rested horizontally on the track of the elevator disposed on the triangular structure facing the winch, this structure being then inclined in line with the other elevator and with the fixed ramp. If welding is carried out with a laser, the laser source is arranged in place of the motorised track elevator on the triangular structure facing the winch, which always remains inclined in line with the fixed ramp, while the pipe is rested horizontally on the track of the motorised elevator which has been disposed on the triangular structure facing the tensioning devices in place of the non-motorised elevator. The triangular structure supporting the elevator with the tube is then inclined in line with the fixed ramp.

According to a further characteristic of the invention, the fixed ramp is fitted with three fixed rocker cradles provided with tracking, which support the pipe before it passes through the three tensioning devices of the sea craft, and the internal ramp is fitted with four rocker cradles to support the pipe in accordance with the optimum profile for its laying, and of which the first three are composed of a track, track support rollers and a frame anchored to the ramp. In addition, the ends of the central axis on which the track support frame rotates are inserted into two sliders which can be displaced vertically, including remotely, by two rack reduction units. The sliders are fitted with load cells to remotely indicate the load acting on the rocker cradle. Two transverse load cells are provided on the third rocker cradle to measure the forces normal to the ramp plane. The fourth rocker cradle, towards the stern of the craft, is constituted by two spaced-apart rectangular roller support frames, each fitted with four rollers. The two frames are supported by a member rotating about a central pivot which can be elevated and on which all the forces are unloaded. This double articulation system always ensures contact at eight points between the eight frame rollers and the deformed pipe to be laid. Said rocker cradle is also provided with two vertical load cells. Two longitudinal members fitted with rollers are welded to the frame of the first, second and third rocker cradle, on each side, their purpose being to keep the pipe to be laid on the track, and to oppose any lateral thrusts. On the first, second and third rocker cradle there is mounted a double acting hydraulic cylinder which, when controlled, raises a roller so as to provide a support for the cable of the winch used for releasing and recovering the pipe, this winch being disposed towards the bow of the laying craft, so preventing sliding of the winch cable on the rubber surface of the track.

The external ramp is fitted with five rocker cradles, of which that arranged at the lower end of the ramp is similar to the fourth rocker cradle of the internal ramp, with the difference that the member which swivels about the central pin cannot be raised. The other four rocker cradles are each composed of two rectangular roller support frames hinged to the top of a system composed of two beams hinged together at one end, and which can therefore be opened and closed in the manner of a book by hydraulic or mechanical equipment disposed at the other end, said system being able to swivel about a pivot fixed on a horizontal beam adjustable in height.

According to a further characteristic of the present invention, the method for laying a pipe on deep sea beds from a semi-submersible craft, the upper deck of which is supported by five columns for each of the two keels provided with anti-rolling fins, and is fitted with three tensioning devices to give maximum reliability to the pipe clamping operation, consists, once the craft has reached the operating zone, of positioning the internal ramp at an angle to the fixed inclined ramp as dictated by the depth of the sea and the diameter of the pipe, by operating the movement and locking system for the main and secondary carriages connected on one side to the inclined uprights and on the other to the internal ramp, so simultaneously also lowering the external ramp, slidable on the rollers mounted on the slides of the support tower, from its vertical maximum height position in which it was positioned during navigation, to the position corresponding to the extent of lowering attained by the end of the internal ramp to which it is hinged; then connecting the two tubular support arms to the external ramp once lowered; then releasing the external ramp from the tower and tilting said external ramp until it assumes the set inclination for the launching operations, by operating the moving and locking system for the main and secondary carriages connected on one side to the guide rails arranged on the soffit of the deck, and on the other side to the support arms hinged to the external ramp; then possibly connecting the external ramp to the articulated ramp or its extension if this is required by the launching conditions for the pipe.

According to a further characteristic of the present pipelaying method when, because of adverse sea conditions the pipe has to be abandoned on the sea bed, the pipelaying craft can remain on the spot by removing the external ramp from its working position by bringing this ramp into a different position, known as the survival position, by counter-tilting by moving the support arms backwards; thus the external ramp assumes a vertical position, in which it is made firm by fixing to the slides of the support tower; in this manner, the external ramp is not damaged by waves, and can be relowered into its working position when the weather and sea conditions have improved.

A further characteristic of the present invention consists of the fact that the upper deck of the pipelaying craft comprises three lanes, the two side lanes being used for storing the pipes and for moving the cranes used for unloading the supply vessels. These vessels arrange themselves along the two sides of the pipelaying craft and are unloaded simultaneously. The pipe portions can be conveyed either to the stern which houses the welding station for double jointing, and from which the double jointed pipes are fed to the bow on suitable longitudinal conveyors, or can be conveyed directly to the bow if a double joint is not required, or again can be deposited in the two storage lanes. At the bow, the pipes are picked up alternately by two overhead travelling cranes which arranged them one at a time on the swivel platform, which by means of the already described operations aligns the pipe portions with the pipe to be laid, and to which they are then welded.

A further characteristic of the invention is the electronic control system which processes the data received from various sensors and compares it with the programmed data for the laying operation, to then continuously and automatically set the position of the craft during the pipe laying; said system is based on the use of a first computer which makes only the calculations for determining the design parameters, and a second computer which receives the actual data provided by the various sensors and processes it.

The results of processing by the two computers are continuously compared, so as to indicate the situation at any moment, and thus provide the relative control.

On the basis of a three-dimensional static and dynamic structural analysis, said first computer optimises the parameters characterising the forces on the pipe being laid in relation to the conditions under which the craft is operating, so providing the required values for the best positioning of the craft and pipe. On the basis of the programmed tensions and the actual tensions, the second computer processes the operating data for the laying, and transforms it into the relative control signals. The first computer also provides values representing the programmed position of the craft as required for the pipe to lie on the sea bed along the scheduled trajectory, provides the values for the configuration of the pipe being laid (already described in Italian Pat. Nos. 941,166 and 998,126 of the same applicant), provides the values for the immersion of the two keels of the craft, and plans the succession and method for raising and laying the anchors (e.g. pull, length, direction and position of the anchors, and the operation of the drives); all these values programmed by the first computer are fed into the second computer to compare them with the values pertaining to the actual situation, and to transform them into the control signals to be fed to the operating equipment.

The second computer processes the data determined by the sensors for all the forces acting within the environment in which the craft operates, and also processes the data provided by the system for determining the position of the various craft which cooperate in the laying operation, the data provided by satellites, the data provided by the radio navigation systems, and the data provided by the "doppler speed log" system, and combines and selects said data in order to determine the position of the craft.

A further characteristic of the invention is the method for determining the position of the craft, which obviates the drawbacks and deficiencies due to various disturbances in the radio navigation systems which transmit signals which are transformed into latitude and longitude values, which in their turn are transformed into x and y coordinates representing the position of the craft. This method represents a system for calculating the position of the craft, starting from a given craft position, in which the results of the data provided by a radio navigation system and a doppler speed log system for determining the craft speed and data representing the bow direction of the craft are combined with the data supplied by sensors disposed on the pipe tensioning devices and on the anchor cable winches, relating to the lengths, tensions and azimuth and horizontal angles both of the cables which connect the craft to the anchors, and of the pipe during the laying period, and the data provided by the gyroscopes and accelerometers relating to the oscillation and movements of the craft, to correct the previous data.

The second computer also compares the obtained data with the data programmed by the first computer for the pipe to be able to be laid along the scheduled trajectory.

To determine the movements of the craft, the second computer processes the data provided by various sensors, including a system of gyroscopes for the yaw, roll and pitch, and a system of accelerometers for the surge, sway and heave, this latter being composed of sensors disposed both at the centre of gravity of the craft and at the four ends to the two keels to determine the rotational list of the craft about the azimuth axis through the centre of gravity. The detection system constituted by the various sensors and said computers is able, in the described manner, to provide at all times the ships position, the position of the pipelaying craft relative to the pipe being laid, and the actual movements of the craft. In this manner it is possible to ensure a positioning and laying accuracy of the order of one meter. The systems known to the art do not attain such an accuracy, and do not enable pipes to be laid at great depth. The second computer also provides the control signals relative to the ballasting of the pipelaying craft and also suitably positions the pipelaying ramps as in Italian Pat. Nos. 889,384; 955,150; 999,124, and 971,058 of the same applicant.

Another function carried out by the second computer is to provide, by control signals, the necessary forces to be impressed on the three tensioning devices, on the four azimuth drives and on the twelve anchor winches, both to keep the required position of the craft dynamically correct and to provide the warping motion for the laying.

The second computer also processes control signals for emergency operations, such as the abandonment and recovery of the pipe and the "survival" state in very agitated sea conditions. In this respect, the craft according to the present invention is able to maintain its position even under very adverse conditions. Craft of the known art must generally seek shelter in calm localities under such conditions.

A further characteristic of the craft according to the invention is the use of a supplementary service calculation function, the specific purpose of which is to divide-up and provide the available powers within a predetermined scale of priorities in such a manner as to keep the installed power at an economically advantageous value.

The second computer is also able to indicate error, malfunction and faulty operation situations, and in all cases to maintain the craft and pipeline within safety limits by supplying the operator and the first computer with the changes in the parameters which govern the behaviour of the craft, by means of a self-adapting control system divided into three different lines. The first of these lines concerns the change in the value of the gains of the control sub-system for the winches and tensioning devices, which can also be manually controlled, and the change in these values with time, said changes being functions of the elasticity of the cable and pipe system, the tensions and the depth because of the configuration of the system comprising the craft, the anchor cables and the pipe being laid, and the compensation of these parameters is effected on the basis of the values representing the sea depth, the forces in the cables and pipe, and the pipe diameter as far as the tensioning devices of the craft are concerned.

The second of said self-adapting parameter control system lines concerns the control parameters for the horizontal position of the craft, and as it forms part of the control system of the second computer is of automatic or semi-automatic type, and the change in the parameter value takes place for the following reasons.

Firstly, to obviate the deficiency in compensation of the variations in elasticity of said system formed by the craft, anchor cables and pipe being laid which affects the variation in the times employed by the equipment, and which influences in its turn the dynamics of the craft. Secondly, to optimise the horizontal position of the craft by obviating the lack of feeding of the values of the actual movements of the craft. Thirdly, to carry out control in a different manner when the craft has to keep its station or when warping has to be carried out. Fourthly, to obviate the various time response effects of the different equipment used for compensating the differences between the values of the actual situations and the required values of a predetermined programme, by determining a different gain scale for the various regulators which assign the forces to be imposed on the various apparatus by proportional, integral or derivative control, as in the case of the propulsion units and winches which respond differently to the control signals from the regulators, the former effecting quicker reactions than the latter.

The third of said self-adapting parameter control system lines selects, by way of the second computer, the various methods of effecting the laying of the pipe based on the combination of the effects of the winches in their locked or pulling state, and the effect of the propulsion units either at rest or in motion, said combination having a varying effect on the behaviour of the craft. In this respect, when this latter is at rest, in order to be able to weld the pipe portion to the pipe being laid, a certain maximum positioning error must not be exceeded, this error being the limit of tolerance on the movements within which the pipe portion can still be welded to the pipe, and in addition another maximum positioning error must not be exceeded, this error being greater than the former and due usually to the sea conditions, under which as the integrity of the pipe being laid is put into danger, the craft is compelled to begin its abandoning of the pipe. On the other hand, if the craft is warping, the operation must not exceed a predetermined time limit in order for the length of pipe laid per unit of time to be able to reach a high value, said position and time limits being different for each sea depth and for each angle between the resultant of the external forces and the bow direction of the craft. These factors also determine the optimum anchoring model for the craft, by way of the first computer. Furthermore, the self-adapting control system minimises the use of the equipment employed by suitably choosing the method of operation. Under normal conditions, the craft is kept in position only with the winches, and warping will be carried out by only operating these. According to a preferred embodiment, under heavy sea conditions the above operations are carried out by also using the propulsion units, and employing the winches only for warping. Under worse sea conditions, when the limits for welding and effectiveness are again reached, the craft maintains the winches operating and the propulsion units in motion both when at rest and when warping. Under strongly agitated sea conditions when the limit for welding is again reached, welding is interrupted and the craft remains at rest on its spot with the pipe on the ramp. Under stormy sea conditions when the craft is undergoing maximum movement compatible with the integrity of the pipe, the pipe abandoning operation is commenced and the craft then assumes its survival position on the stop with the external launching ramp tilted upwards and fixed to the support tower.

A further characteristic of the present invention is the method for controlling the peak loads which can occur at the tensioning devices for the pipe being laid or at the anchor cable winches, when the pipe or cables swing in such a manner as to give rise to said peak loads which can cause fracture of the tensioning devices or winches.

According to said method, the pipe being laid is provided internally, and the anchor cables externally, with a series of carriage devices similar to those described in Italian Pat. No. 998,126 of the same applicant. The method is characterised in that said devices are connected together, via articulated joints, by rigid rods of known length, each provided with an inclinometer, and the first device of the series is provided with a pressure switch and a supply cable for measuring the sea depth at the point in which it is applied. The depth of the other points is easily calculated as the angular distance between them is known.

The devices, as indicated in said Italian Pat. No. 998,126, are each provided with a gravity inclinometer sensitive to the inclination of the carriage in a vertical plane, a gyroscope sensitive to the angular displacements of the carriage in a horizontal plane, and an accelerometer for measuring the displacements of the carriage in a horizontal plane. With said devices it is possible to determine both their depth and the distance of the pipe laying craft from the points in which they operate, and the angles between the tangents to the pipe or cables at said points and the respective verticals, so that knowing the slope of the rigid rod and the distance between the two devices, the pattern of the pipe or cable curvature can be determined by a series of measurements. These measurements, when subjected to the corrections relative to the displacements determine by the gyroscope and the displacements determined by the accelerometer, indicate the variation in curvature with time, and hence the variation in the configuration of the pipe or cables. From the value of the parameters of said variation and the pull of the pipe or cables on the tensioning devices or winches, the parameters indicating the situations under which the so-called peak loads can occur on the tensioning devices or winches are deduced. Consequently, all the members concerned are kept in a safety condition by feeding control signals to the winches or tensioning devices.

The invention is clarified hereinafter with reference to the accompanying drawings, which illustrate a preferred embodiment given by way of non-limiting example, in that technical or constructional modifications can be made thereto without leaving the scope of the present invention.

In the drawings:

FIG. 1 is a diagrammatic side view of a semi-submersible craft suitable for laying pipes, including those of large diameter and on deep sea beds, and provided with the launching apparatus according to the invention.

FIGS. 2 to 5 are diagrammatic side views of the positions assumed by the pipe launching apparatus, according to the methods of the invention.

FIGS. 2a to 5a are diagrammatic front views from the stern of the craft showing the positions illustrated in FIGS. 2 to 5.

FIG. 6 is a diagrammatic side view of one of the positions assumed by the internal, external and articulated ramps during the pipe laying operation.

FIGS. 7 and 7a are a side and plan view of the internal ramp.

FIG. 8 is a partial front section through the right hand side of FIG. 9, illustrating one of the two pairs of main and secondary carriages which support the internal ramp by a connection rod.

FIG. 8a is a section of the line BB of FIG. 8.

FIG. 8c is a section of the line CC of FIGS. 8b and 8a.

FIG. 9 is a section on the line AA of FIG. 7a, and represents the portal which supports and contains the internal ramp.

FIG. 9a shows the uprights connected to the keels of the craft and the relative containing rods.

FIGS. 10 and 10a are a side and plan view of the external ramp.

FIG. 11 is a plan view of a detail of the connection between the tubular guide 66 of the external ramp and the stern tower of the craft.

FIG. 12 is a side view of a detail of the inclined uprights, of the carriages on the soffit rail and of the connecting arms between said carriages and the external ramp.

FIG. 13 is a plan view from below of the connection between the connecting arms for the external ramp and the main carriages slidable on the rails of the craft soffit.

FIG. 14 is a plan view of the craft deck, showing the areas for loading and storing the pipe portions.

FIG. 14a is a central longitudinal section through the craft, illustrating the equipment installed on the fixed ramp and internal ramp.

FIG. 15 is a side view of the internal ramp equipped with four rocker cradles. The first three rocker cradles are the same, and FIGS. 15a and 15b show a front view and a side view respectively of one of them.

FIGS. 15c and 15d are a front and side view respectively of the fourth rocker cradle. FIGS. 16 and 16a are a side and plan view respectively of the external ramp fitted with five rocker cradles. The first four rocker cradles are the same, and FIGS. 16c and 16d show a side and front view respectively of one of them. FIG. 16b is a section through a detail of the mechanism which adjusts the height of the support frame of each rocker cradle.

Figure 17:
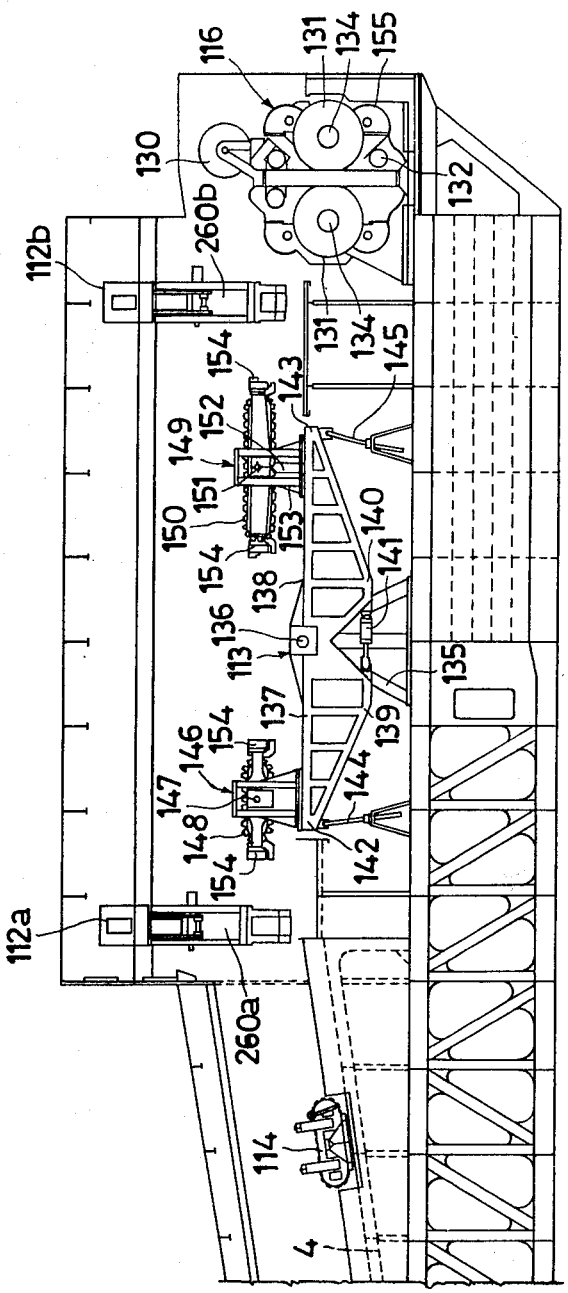

FIG. 17 is a side view of the swivel assembly and the winch for abandoning and recovering the pipe being laid.

Figure 18:
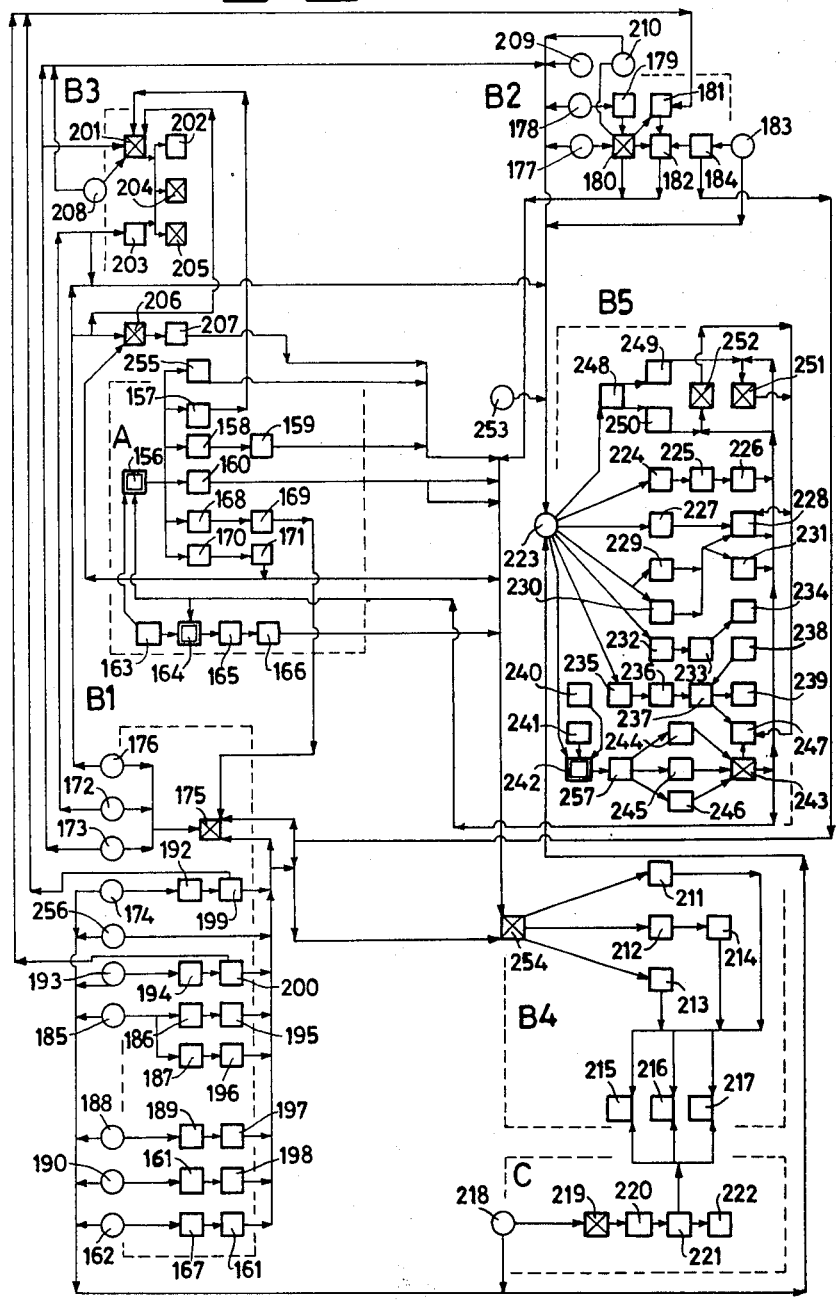

FIG. 18 illustrates, by means of a block diagram, the apparatus and computers installed on board the craft.

Figure 1A:
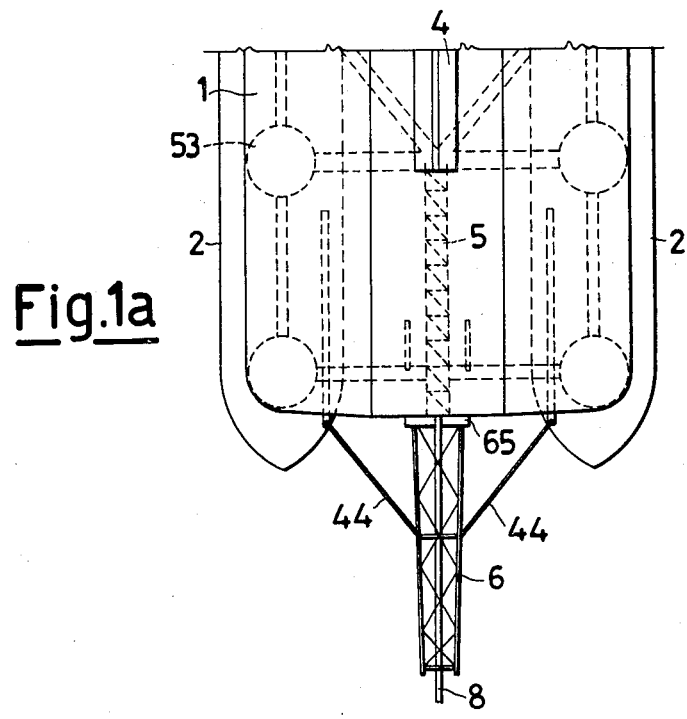
FIGS. 1a and 1b are partial plan and front views respectively of the craft shown in FIG. 1.
Figure 1B:
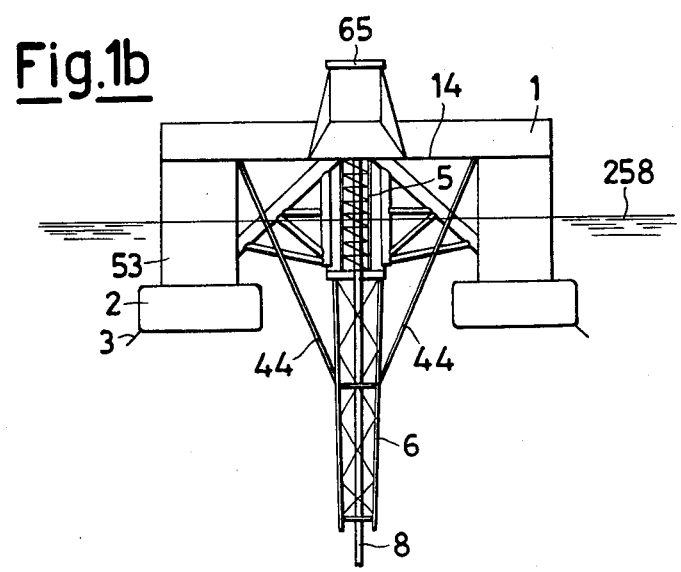

With reference to FIGS. 1, 1a and 1b, the semi-submersible pipelaying craft is indicated by 1, its keels by 2 and its rolling fins by 3. The sea surface is indicated by 258 and the sea bed by 83. The fixed launching ramp is indicated by 4, the internal ramp by 5, the external ramp by 6 and the articulated ramp by 7, whereas the pipe to be laid is indicated by 8.

Figure 8B:
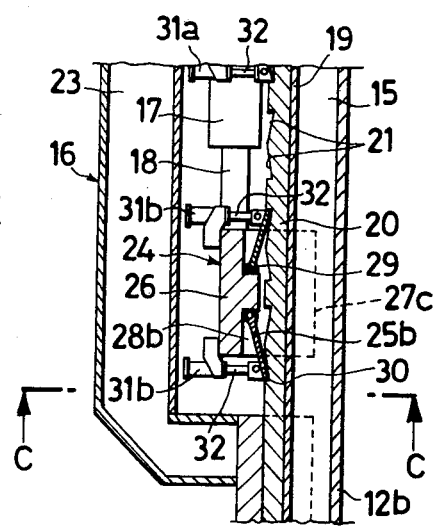
FIG. 8b is a detail of the secondary carriage.
Figure 8C:
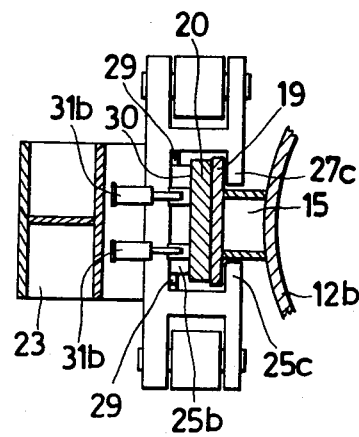

In FIGS. 2 and 2a, the craft 1 is under navigation with the internal ramp 5 in the horizontal position, while the external ramp 6 is in the vertical position, whereas there is no ramp 7, this latter being added to the external ramp 6 if required by the pipe laying conditions. In FIGS. 3 and 3a, the craft, having reached the site of operations, lowers the internal ramp 5, so compelling the external ramp 6 to descend into a lower vertical position. In FIGS. 4 and 4a, the external ramp 6 connected to the support arms 44 is tilted to assume an angle corresponding to the requirements of the laying operation, whereas in FIGS. 5 and 5a the craft 1 has interrupted the laying operations because of adverse sea conditions, and the external ramp 6 is turned upwards to assume the so-called survival position, which is an ideal position because the ramp is protected to the maximum extent from the waves. In FIG. 6, the internal ramp 5 is connected to the fixed ramp 4 by the pivot connectors 9, and at the other end it is connected to the external ramp 6 by the hinges 91, and is positioned on the inclined uprights 12b by the connecting rods 35 shown in FIG. 8b. Thus the external ramp 6 is connected to the internal ramp 5 by the hinges 91 and at the other end is connected to the articulated ramp 7 by the hinges 92, and is positioned by the support arms 44 connected at one end to the ramp itself by the hinged support 45, and at the other end to a carriage slidable on the horizontal rail 49 of the soffit 14 of the deck of the craft 1. In FIGS. 7 and 7a, the internal ramp 5 is constituted by a framework of square section, the lower ties 11a and upper ties 11b being of circular section, the framework terminating on the sea side with the transverse beam 10 of circular section, provided with bracket connectors 10b for connection to the hinges 91 of the external ramp 6, as indicated in FIG. 6.

FIGS. 8, 8a, 8b and 8c show details of the inverted portal 12a shown in FIG. 9, and the connection between the uprights 12b thereof and the ties 11a of the internal ramp. Said uprights are connected together by the lower horizontal beam 12c, and said portal 12a is reinforced, as shown in FIG. 6, by the two tie bars 13. The reference numeral 15 indicates the two guide rails of box structure fitted on the two said inclined uprights 12b. The top of said rails is formed by a plate 19 on which is mounted the rack 20 comprising notches 21 which act as a seat for the long sides 30 of the special small rectangular hooking plates 25a hinged by pins 29 to the main locking and raising carriages 16 and to the secondary locking carriages 24 which serve for the movement of the internal ramp 5 along the inclined uprights 12b by means of said rods 35 which connect the carriages 16 to said internal ramp 5. Said main carriage 16 is composed of the upper embracing plate 22b, which can slide along said rail plates 19 and is connected by the bridge plate 23 to the lower embracing plate 22a embracing said rail 15 by way of the slide guides 27b. In the middle of the main carriage there is welded a pin 34, on which the big end of the connecting rod 36 is pivoted and is locked on the pin by the two discs 33 fixed to the pin.

The bottom of the connecting rod big end 36 is connected by the pin 37 to the central part 35 which, by way of the pin 38, is connected to the connecting rod 39, the bottom of which is pivoted on the pin 40 welded to the lower tie 11a of the internal ramp 5 and is locked on said pin 40 by the discs 41. In this manner, as the end of the internal ramp 5 swings on said inclined uprights 12b, the internal ramp 5 can slide both on said lower plate 22a and, by way of the box rib 42, on the outer surface of the disc 33 of said main carriage 16, so that any horizontal forces induced on the internal ramp 5 by the pipe to be laid are transmittted by the former through said main carriage 16 to said inverted portal 12a, which absorbs them totally. Said upper embracing plate 22b, which embraces said plate 19 together with the upper slide guide 27a, comprises slots 28a for housing said small rectangular hooking plates 25a, which are two in number, and which, on command, respond to the stresses induced in them by the rods 32 of the four hydraulic double acting small locking cylinders 31a fitted by supports 43 to the edges of said upper embracing plate 22b of the main carriage 16, and become inserted into or withdraw from said cavities 21 in said rack 20, so as to lock said main carriage 16 to, or release it from said rack 20 fitted on said inclined uprights 12b. Said secondary carriage 24 embraces said plate 19 by way of the slide guide 27c and houses the small rectangular hooking plates 25b in its slots 28b, and is provided with the four small double acting hydraulic locking cylinders 31b for moving said small plates 25b on said rack 20, in order to be able to lock said secondary carriage 24 on said rail 15 of said upright 12b or release it therefrom. Said upper embracing plate 22b of said main carriage 16 is connected to the embracing plate 26 of said secondary carriage 24 by the two double acting hydraulic actuator cylinders 17 which by means of their rod 18 cause the main carriage 16 and secondary carriage 24 to move relative to each other so that, on command, the end of said internal ramp 5 can be raised or lowered along said two inclined uprights 12b. It is raised by fixing the plates 25b, then releasing the plates 25a, then causing the rods 18 to emerge from their cylinders until the plates 25a can be inserted into the notches 21 in the rack 20 so that the main carriages rise by a portion corresponding to the elongation of the rods 18, then again fixing the plates 25b and so on. Alternatively, the internal ramp 5 can be lowered by fixing the plates 25a, then releasing the plates 25b, then extending the rods 18, and then lowering the secondary carriage, fixing the secondary carriage 24 on the new notches in the rack 20, then releasing the plates 25a of the main carriage, then lowering the main carriage by the portion corresponding to the amount the rods 18 have withdrawn, and so on until the main carriage is fixed in the required position corresponding to the predetermined angle which said internal ramp 5 is to assume.

In FIG. 9a, instead of being connected in the manner of a portal by the horizontal lower beam 12c, the two inclined uprights 12b of the inverted portal are connected externally by the horizontal beams 82 to the lateral keels 2 of the pipelaying craft, and internally together by a system composed of two rods 84 connected at one end to the pistons of two hydraulic cylinders 105 hinged by two universal joints 99a to the plates 22a of the main carriages slidable inside said uprights, and are connected at the other end by two universal joints 99b to the axle 85, which is connected to the centre of the lower tie 97 of the internal ramp by the ring 95 welded to the plate 96. The cylinders 105 are connected together by the hydraulic piping system 106 in such a manner that when one piston tends to move in one direction, the piston of the other cylinder is thrust in the opposite direction, and the longitudinal axis of the internal ramp 5 is obliged to remain equidistant from the two uprights 12b, and thus the horizontal thrusts induced by the pipe on the ramp are opposed.

FIGS. 10 and 10a show the external ramp 6 formed from a frame of quadrangular section, the lower longitudinal ties 93 of which are of circular section and are connected by diagonals and uprights to the upper longitudinal circular section ties 94 which are provided with various supports, not shown, for supporting the pipe to be laid. In the centre of said external ramp 6 there is disposed the hinged support 45 for connecting the ramp to the support arm 44. The tubular positioning guide 66 for the external ramp 6 branches from said hinge 45, and can slide on the rollers 68 as shown in FIG. 11. It is fitted with the lateral flanges 67 which can be tightened against the support tower 65 for said external ramp 6, by causing the slides 69 to approach thereto, when the external ramp is tilted upwards to assume the survival position or the position suitable for navigating said craft 1. Said slides 69 for locking said guide 66 are provided with rollers 70, and slide on said tower 65 along the dovetail slide channels 71 by the thrust impressed by the double acting hydraulic cylinder 79 fitted on to said tower 65, its rod 80, hinged to the rod 107, rotating the pivot joint 78, so causing the connection arm 77 to rotate about the fixed pivot 76, this connection arm being connected by the rod 61 to one of said slides 69. Said arm 77 is connected by the toothed sector 62 to the toothed sector 63 of the rod 72 pivoted at 64 and connected by the rod 74 to the pivot 73 of the other slide 69, so that the two said slides 69 can slide along said channels 71 in opposite directions to each other.

In FIG. 12, one of the support arms 44 is connected by its hinged end 46 to the pivot 47 mounted on the carriage 58, slidable on one of the two horizontal guide rails 49 mounted on the soffit 14 of the deck of the craft 1, parallel to the line of the columns 53.

As is further shown in FIG. 13, on the web 50 of said rail 49 there is disposed the plate 54 on which is mounted the rack 55 comprising the cavities 56 acting as the seat for the small hooking plates 60 operated by the small double acting hydraulic cylinders 57 mounted on the main carriage 58 and secondary carriage 59 which are connected together by the rods 52 of the double acting hydraulic actuator cylinders 51, so that when said support arms 44 move along said rails 49, they cause said external ramp 6 to assume its optimum angular position for the pipe laying operation, and to tilt from its vertical survival or navigation position to its optimum position for pipe laying or vice versa. Said movement is therefore characterised by the use of apparatus similar to that used for moving the end of the internal ramp 5 on the inclined uprights 12b, by the relative movements between main and secondary carriages.

In FIGS. 14 and 14a, the upper deck 108 of the pipelaying craft 1 is divided into two lanes 109 along which two cranes run for loading the pipe portions, which are then deposited towards the stern 110 for the double jointing operation or in the centre of the craft to be subsequently conveyed to the bow 111 of the craft by normal conveying apparatus, and disposed in front of the pipe to be laid by way of the supports 260a and 260b suspended from the beams of the overhead travelling cranes 112a and 112b which slide along the beams 259, and by operating the swivel assembly 113. The pipe 8 to be laid is supported on the rocker cradles 114 disposed along the fixed ramp 4 and internal ramp 5, by way of the three tensioning devices 115. During abandoning operations due to worsening environmental conditions, or during recovery operations, said pipe 8 is manoeuvred by the craft 1 by operating the tensioning winch 116. FIG. 15 shows the installation of the four rocker cradles 114 in the internal ramp 5.

FIGS. 15a and 15b show the composition of one of the first three rocker cradles 114, starting from the tensioning device 115. The track 117 on which the pipe 8 to be laid rests rotates on the rollers 118 supported by the frame 119, which can swivel about the central axle 120 which, at its two ends, is inserted into the two sliders 123 which move vertically, guided in the guides 124 fixed to the sides of the structure. The sliders 123 can be moved remotely by the two rack units 121 situated on the outer sides of the frame 125. The load cells 122 are installed in the sliders 123 to determine remotely the load on the rocker cradle. Potentiometers are installed on the reduction units 121 to determine remotely the level of the rocker cradle. In addition, the two flanges 126 support the two containing rollers 127 which keep the pipe to be laid 8 on the track by opposing lateral thrusts, and the lifting roller 128, controlled by a double acting hydraulic cylinder, not shown, can be raised or lowered in order either to support or release the cable of the tensioning winch 116 during the abandoning or recovery of the pipe to be laid due to changing environmental conditions, so that the raised cable does not deteriorate the rubber surface of the track 117.

FIGS. 15c and 15d show the composition of the fourth rocker cradle 114 starting from the tensioning device 115. It has no track, and is composed of the member 265 which swivels about two pins 266 disposed in the two blocks 267 which slide vertically along the guides 268 of the support towers 269. Said member 265 supports two frames 270 which rotate about the pivots 48 and which each support the four rollers 75 which are disposed as a V, two on one side and the other two on the other side of the pipe to be laid 8. The two blocks 267 are also provided each with a load cell, not shown.

FIGS. 16 and 16a show the installation of the external ramp 6 with the five rocker cradles 103, the last of which, on the sea side, is similar to the fourth rocker cradle of the internal ramp, but cannot be lifted in height. The other four rocker cradles, as shown in FIGS. 16b, 16c and 16d, are each fitted on the support beam 86, which is adjustable in height and can be fixed by pins to the bores 81 disposed at the ends of said beam, and on the uprights 261 of the external ramp 6. They also comprise the frame 87 which swivels on said beam 86, and the counter-frame 88, these being hinged together at one end by the pivot 89 and connected together at the other end by the mechanical jack 90 which lifts the counter-frame 88 on which are positioned the two swivel roller supports 98 hinged on the pivots 100 and supporting the slide rollers 101. Said mechanical jack 90 is composed of the worm 102 driven by a motor, not shown, and transmitting motion to the ring gear 104 rigid with the threaded shaft 129 which acts on the lead screw 133 to move the sleeve 262 vertically. Said sleeve is connected to the counter-frame 88 by the terminal 263 fitted with the load cell 264 for remotely determining the load acting on the external ramp 6.

FIGS. 17 and 14 show the two overhead travelling cranes 112a and 112b, which can be positioned along the beams 259 (which are shown superimposed in FIG. 17) according to the length of the pipes. The two pairs of supports 260a and 260b are suspended from said overhead cranes for supporting the pipes, and move alternately transversely to the laying craft in order to carry the pipes in front of the pipe to be laid. From FIG. 17 it can be seen that the tensioning winch 116 is constituted by the guide drum 130 for the cable to which the pipe to be laid 8 is connected, and by the two contact wheels 131 about which the cable passes. As the cable descends from the drum 130 it winds about only one half of one of the two wheels 131, then passes to the other wheel 131, winding about only one half of that before passing round the deviation roller 132, so preventing the cable from straddling the two wheels 131, the rims of which are provided with grooves. Said winch 116 also comprises said roller 132 for positioning said cable towards the re-winder, not shown, which has a capacity to wind at least 2000 meters of cable, its motor being regulated so as to keep the tension in the cable constant as the winding diameter varies. Said two contact wheels 131 are connected to the motor via a speed reducer, not shown, and are mounted with their axles 134 rotating on roller bearings on the frame 155. From FIG. 17, it can also be seen that said swivel assembly 113 is formed by a base 135 comprising the support for the pivot 136 about which the triangular structures 137 and 138 rotate, their lower vertices 139 and 140 being connected together by the double acting hydraulic cylinder 141, and their vertices 142 and 143 being connected to the deck 108 of the craft by hydraulic cylinders 144 and 145 respectively. The rocker track elevator 146, pivoted on the pivot 147 and supporting the track 148, is disposed on the top of the structure 137. The driven track elevator 149, supporting the track 150 and pivoted on the pivot 151, is disposed on the top of the structure 138 and is mounted on the column 152 and movable vertically by the action of a double acting hydraulic cylinder, not shown, and rotatable on the base 153, which can slide in both directions longitudinally and transversely to the craft, in order to align the pipe portion disposed on the swivel assembly 113 with the pipe to be laid 8. The containing rollers 154 for the pipe are disposed at each end of the frames which support the tracks 148 and 150.

FIG. 18 shows the integral control system for the calculations and operations involved in the automatic dynamic positioning of the craft during the pipe laying. This is based on the first computer A, the second computer, the processing sections of which are indicated by B/1, B/2, B/3, B/4, B/5, the third computer C and the various sensors and controls which cause the equipment to undergo the various operations.

In A, the structural analysis system for optimising the parameters characterising the forces on the pipe being laid in relation to the characteristics of the environment in which the craft is operating is indicated by 156, this giving the values 157 for the proper positioning of the pipelaying craft in order to maintain the forces on the pipe being laid within their limits, and the optimum values 158 for the tensions in the pipe in relation to the position and dynamics of the craft, these tensions being controlled at 159 such that they do not exceed the admissible values, which are compared with the actual values of the tensions in the pipe and then converted into control signals to be fed to the equipment which lays the pipe. These are followed by the optimum values 160 for positioning the pipe laying means such that the pipe lies on the sea bed along the scheduled trajectory, and the values 168 for the elastic deformation to which the pipe must be subjected, with the consequent configuration 169 which the pipe assumes. These are followed by the optimum values 170 for the immersion of the pipelaying craft, and the relative values 171 of the draft on each end of the two keels of the pipelaying craft, and the optimum values 253 for the thrust and direction of the propulsion means. The system 164 gives, at 165, the lengths, configurations and pulls for the anchor cables, and at 166 the anchor weighing succession by the tugs. All these values vary as the environmental conditions vary on the basis of the meteorological forecasts 163.

At B/1 the second computer gives the characteristics of the horizontal forces acting on the pipelaying craft and on the pipe being laid, 256 indicating the direction and intensity sensors for the thrust exerted by the propulsion means, 176 the draft sensors for the pipelaying craft, 172 the sea depth sensor, 173 the heading and list sensors for the pipelaying craft and 174 the oscillation, pull, length and angular position sensors for the pipe being laid, which are determined at 192 and evaluated at 199, and which give the actual configuration 175 of the pipe being laid. 193 indicates the sensors for the oscillation, pull, length and angle of the cables, these being determined at 194 and evaluated at 200. The horizontal forces acting on the pipelaying craft, such as the intensity, velocity and direction of the wind and sea current, the wave direction, the significant height and period of the waves, are determined at 186 by the sensors 185 and evaluated at 195, and the forces acting on the pipe being laid are determined at 187 by said sensors and evaluated at 196. The sensors 188 determine at 189, and evaluate at 197, the forces and movements induced in the pipe being laid, on the various launching ramps. The sensors 190 determine at 191, and evaluate at 198, the forces and angle between the articulated ramp (stinger) and external ramp. The sensors 162 determine at 167, and evaluate at 161, the forces exerted by the pipe on the tensioning devices.

At B/2 the second computer processes the radar signals 209 to determine the position of the craft which cooperates in the laying, such as the semi-submersible craft for supplying the pipes, the tugs for weighing and laying anchors, the workshop craft for underwater work, and the craft for observing the sea surface in which the laying operations are carried out. In addition, it processes the data supplied by the satellites 210 for determining the position of the pipelaying craft, determines and processes the data 177 provided by the medium frequency radio navigation systems, and the data 178 provided by the doppler speed log system, this data being integrated at 179, to be combined in the mixed system 180 to give greater accuracy to the determination of the position of the pipelaying craft. The values of the system 180 are combined with the values representing lengths, pulls, angles and oscillation both of the pipe, as at 199, and of the anchor cables as at 200, after suitable correction for the rotation and local displacement of the craft determined by the gyroscopes and accelerometers 183 and evaluated at 184, this combination being made to determine at 182 the position of the pipelaying craft, especially at determined times during the night.

In B/3 the second computer, on the basis of the immersion data calculated by the first computer and on the basis of the sensors 176, processes the immersion data at 206 to give at 207 the control signals for said immersion, and processes at 203 the data from the sea depth sensor 172. On the basis of the data from the sensor 173 (heading and list of the pipelaying craft), the data from the sensor 208 (tank ballast levels), the attitude 157 calculated by the first computer, and the data from the draft sensor 176, it calculates the attitude 201 of the pipelaying craft and controls the pumps and valves at 202 in order to regulate it. At 204 it minimises the length of the extended ramp, and at 205 it gives the angle value for the internal, external and extended ramps.

At B/4 the second computer, in accordance with the error in the position of the pipelaying craft determined by the difference between the theoretical position calculated at 160 by the first computer and the actual position calculated at 182, and in accordance with the difference between the environmental forces acting on the pipelaying craft, the tensions in the cables and pipe, and the thrust of the propulsion means, as programmed by the first computer and as determined by the second computer, determines at 254 the forces to be impressed at 215 on the three tensioning devices, at 216 on the twelve anchor winches and at 217 on the four propulsion means, by way of a system of automatic controls 211 or semi-automatic controls 212 using the joystick 214 or manual 213. The total available power is determined by the sensor 218 by the third computer C which at 219 distributes the necessary power to said propulsion means, tensioning devices and winches, and to all the other equipment 222, by the logic distribution system in accordance with the priority of the user item 220, and within the overload limits 221.

At B/5, after analysing at 248 the state of all the equipment by means of the various positioning, navigation, ballast and force sensors, and by means of other sensors 253 for all the other apparatus, which are controlled by the signals 223 from other sensors when a part 249 of the apparatus does not carry out the controlled operations, or a part 250 deviates from the limits within which it is required to operate, the second calculator reacts automatically and at 251 provides for the omissions, to re-establish the limiting conditions at 252, at the same time giving warning to the operators at 247 and an alarm signal 228, all within the safety system which embraces the performance fields 224, 227, 229, 230, 232, 235 and 242. Of these fields, the field 224 involves the signals from the sensors, the parameters of which are calculated at 225 in different ways and compared at 226 in different ways, the field 227 involves the efficiency of the sensors with the emission of said alarm signals 228. The field 229 involves the apparatus faults and the field 230 the defective performance of apparatus with the emission of said alarm signals 228, and the locking 231 of the movements of the various mechanisms. The field 232 involves the number of apparatus, which at 233 must be a minimum, and at 234 is visualised on a screen. The field 235 involves the ways for using the apparatus, for which in the passage from manual to automatic and vice versa at 236, the computer controls the operator at 237, and at 238 the operator controls the computer, and at 239 the computer gives the control signal for said passage. The field 242 involves the variations to be made to the operation systems 164 and 156 in virtue of the determinations 241 made by the calculator on the variations in the dynamics of the pipelaying craft caused by the varying conditions 240 of the environment in which it operates, on account of which variations take place in the parameters 243 relating to the positioning, attitude and draft of the pipelaying craft, the ramp angle, the pull and length of the anchor cables and of the pipe being laid, and the thrusts and directions of the propulsion means, all within a self-adapting system 257 which is visualised for the operator 247. This system is in the form of a first line 244 concerning the variation in the gains of the sub-system for controlling the winches and tensioning devices, and the variation in the time values, and a second line 245 which concerns the control parameters for the horizontal position of the pipelaying craft, and a third line 246 which selects the different methods of carrying out the laying of the pipe by combining and proportioning different operating effects for the winches and propulsion means.

What we claim is:

1. A semi-submersible pipelaying craft equipped with the following means for launching and laying pipes, including at great depth and under hostile environment conditions, comprising:
- (a) an articulated or composite launching ramp including an inner fixed inclined ramp, an intermediate internal inclinable ramp hinged to the fixed ramp, and an outer inclinable external ramp hinged to the internal ramp;
- (b) means operatively connected to the craft and the internal ramp for connecting the internal ramp to the craft and for moving and locking the internal ramp for navigation of the craft and launching and laying pipe, and in hostile environmental conditions;
- (c) means operatively connected to the craft and the external ramp for connecting the external ramp to the craft and for moving and locking the external ramp for navigation of the craft and launching and laying pipe, and in hostile environmental conditions;
- (d) a horizontal swivel assembly on the craft and adjacent the fixed inclined ramp for aligning, with the pipe being laid, the pipe portions to be welded thereto, and for bringing said pipe portions up to the pipe being laid;
- (e) an assembly of rocker cradles and tensioning devices on the fixed ramp for supporting and conveying pipe to be laid from the swivel assembly to the internal ramp;
- (f) an assembly of rocker cradles on the internal ramp for supporting and conveying pipe to be laid from the fixed ramp to the external ramp;
- (g) an assembly of rocker cradles on the external ramp for supporting and conveying pipe to be laid from the internal ramp to the sea side of the external ramp;
- (h) a system on the craft for unloading the pipes from the supply craft and for storing them and bringing them up to the swivel assembly;
- (i) an electronic control system on the craft which processes the data received from the various sensors and compares it with the programmed data for the laying operations, in order to impose on the pipelaying craft an optimum automatic dynamic positioning so that even under hostile environmental conditions, the pipe lays on the sea bed along the required trajectory, even at great depth; and
- (j) means operatively connected to the craft for controlling the peak loads on the pipe laying system which can occur during the pipe laying operation.

2. A semi-submersible pipelaying craft as claimed in claim 1, wherein in addition to the hinges for connecting the internal ramp to the fixed ramp and external ramp, the internal ramp connection means also comprise an inverted protal fixed upperly to the soffit of the upper deck of the craft and contained in a plane inclined to the vertical plane, wherein the portal includes two uprights connected to the soffit with two inside rack rails along which can slide two main carriages, each constituted by an upper and a lower plate connected together by a bridge plate, and to which the internal ramp is connected by two connecting rods comprising articulated joints which are pivoted at their upper ends to pivots fixed to the main carriages, and at their lower ends to pivots fixed to two lower longitudinal members of said ramp, so that this latter can swivel longitudinally about the pivots fixed to the two main carriages and transversely about the joints of the two connecting rods.

3. A pipelaying craft as claimed in claim 2, wherein, the two uprights of the inverted portal are connected externally, by horizontal beams, to the side keels of the craft, and internally together by a system composed of two rods connected at one end to the pistons of two hydraulic cylinders hinged by universal joints to the main carriages slidable in the uprights, and at the other end, by articulated or universal joints, to an axle which is connected to the centre of the lower tie of the internal ramp, said cylinders being connected together by piping in such a manner that when one piston tends to move in one direction, the piston of the other cylinder is urged in the opposite direction, so that the longitudinal axis of the ramp is compelled to remain equidistant from the two uprights, and the horizontal thrusts are opposed.

4. A pipelaying craft as claimed in claim 2, wherein the locking means for the internal ramp include a system having four small hydraulic cylinders housed in pairs along the upper and lower edges of the upper plate of each of the two main carriages, said small cylinders acting, by means of a rod connected to their piston, on two small rectangular plates hinged to said edges of the upper plate of said carriages, to cause said small plates to become inserted into or withdrawn from suitable cavities provided in the racks fixed to the slide rails of the two main carriages, so as to lock the carriages, and hence the internal ramp connected thereto, in the required position, or to release them.

5. A pipelaying craft as claimed in claim 1, wherein the means for moving the internal ramp include
- (a) a secondary carriage situated between the bridge plate of each of the two main carriages and the rack, and comprising a plate which embraces the guide rail and four small hydraulic cylinders housed in pairs along the upper and lower edges of said plate, and which act, by way of a rod connected to their piston, on two small rectangular plates similar to those disposed on the upper plate of the main carriage, and
- (b) two double acting hydraulic cylinders (known as the actuator cylinders), the upper end of which is hinged to the upper plate of the main carriage and the lower end of the piston rod being pivoted on the plate of the second carriage, so that in order to move upwards (or downwards) the internal ramp, which is connected to the main carriages by two connecting rods, it is necessary only to fix the plates of the secondary carriages to the racks by means of the small plates operated by the small hydraulic cylinders; then release the main carriages from the racks by extracting from the cavities the small plates hinged to the edges of the upper plates of said main carriages; then operate the actuator cylinders, which push the rods of their pistons against the secondary carriages already fixed to the racks so as to urge upwards (or downwards) the upper plates of the main carriage to which they are hinged, and thus also to urge the internal ramp through a distance corresponding to the maximum extension of the actuator cylinder rods; then again lock the main carriages to the racks; then release from the racks the secondary carriages, which are raised (or lowered) by the actuator cylinders and re-fixed to the racks; then again release the main carriages and continue the lifting operations until the mobile end of the internal ramp is positioned at the required height.

6. A pipelaying craft as claimed in claim 1, wherein, the external ramp connecting means also comprise two tubular arms hinged at one end to the centre of the ramp and at the other end to two main carriages slidable on two guide rails of a box structure mounted on a deck soffit of the pipelaying craft.

7. A pipelaying craft as claimed in claim 6, wherein the external ramp locking means includes:
(a) a system having four small hydraulic cylinders housed in pairs along the edges of the plate of each of the two main carriages, and operating to lock said carriages in the required position or to release them therefrom, and hence also the external ramp connected thereto by the two tubular arms;
(b) two tubular guides mounted on the upper longitudinal members of the external ramp and provided with lateral flanges which enable said ramp to be coupled to a special support tower disposed on the bridge to the stern of the pipelaying craft; and
(c) means for fixing the external ramp to said support tower, including two double acting hydraulic cylinders which are connected to said support and which, by means of lever systems connected thereto, act on two slides provided with rollers which, as they move so as to approach the flanges of the two tubular guides of the external ramp, clamp said flanges to the stern tower, thereby locking the ramp to the stern of the pipelaying craft.

8. A pipelaying craft as claimed in claim 7, wherein the means for moving the external ramp include:
two apparatus slidable on the soffit rails, each having a main carriage and a secondary carriage connected together by a double acting hydraulic cylinder, said main carriages are slidable on the soffit rails and are connected by said tubular arms to the centre of the external ramp.

9. A pipelaying craft as claimed in claim 1, wherein the horizontal swivel assembly for aligning the pipe portion to be welded with the pipe being laid, and for bringing it up to this latter, is constituted by a central fixed triangular base anchored to the craft bridge, said base being provided in its upper vertex with a pivot about which can rotate two triangular structures, the major side of which faces upwards, and of which one is situated towards the fixed ramp and the other towards a winch on the craft deck and to which the pipe to be laid is connected, the lower vertices of the two structures being connected together by a double acting hydraulic cylinder, and the two ends thereof being connected to the craft deck by a further two double acting hydraulic cylinders.

10. A pipelaying craft as claimed in claim 9, wherein on the horizontal platform formed by said triangular structures there are disposed a rocker track elevator at that end facing the fixed ramp, and a motorised track elevator at that end facing the winch.

11. A pipelaying craft as claimed in claim 10, wherein the tracking of the motorised track elevator is mobile in the two directions by means of a hydraulic motor with a reduction unit, and is supported by a frame which can rotate through a few degrees by means of a screw and lead nut, the centre of which is pivoted on a column which can be moved vertically by the action of a double acting hydraulic cylinder, and which can be rotated on a support base which can slide in both directions longitudinally and transversely to the deck of the craft, so as to align the pipe portion with the head of the pipe to be welded.

12. A pipelaying craft as claimed in claim 1, wherein the fixed ramp is fitted with three fixed rocker cradles provided with tracking to support the pipe before it passes through three tensioning devices disposed after the three rocker cradles on the same ramp.

13. A pipelaying craft as claimed in claim 1, wherein the internal ramp is fitted with four rocker cradles, the first three of which include a track, track support rollers and a frame anchored to the ramp, and the fourth includes two quadrangular roller support frames spaced apart and supported by a member which swivels about a central pivot on which all the forces are discharged, each of the two roller support frames being provided with four rollers in such a manner that there is always contact at eight points between the eight rollers and the deformed pipe to be laid.

14. A pipelaying craft as claimed in claim 13, wherein the ends of a central axle on which the track support frame of each of the first three rocker cradles rotates are inserted into two sliders which can be moved vertically, including remotely, by two rack reducer units, and in the sliders there are installed load cells to indicate remotely the load acting on the rockers.

15. A pipelaying craft as claimed in claim 1, wherein the external ramp is fitted with five rocker cradles thereon, including four rocker cradles with two quadrangular roller support frames hinged to the top of a system with two beams which are hinged together at one end, and therefore can be opened and closed in the manner of a book by hydraulic or mechanical equipment disposed at other end, said system being able to swivel about a pivot fixed to a horizontal beam adjustable in level, and a fifth rocker cradle arranged at the lower end of the ramp which includes two quadrangular roller support frames spaced apart and supported by a member which swivels about a central pivot on which all the forces are discharged, each of the two roller support frames being provided with four rollers in such a manner that there is always contact at eight points between the eight rollers and the deformed pipe to be laid.

16. A pipelaying craft as claimed in claim 1, wherein the electronic control system includes by:
(a) a first computer which optimises the parameters characterising the forces on the pipe being laid, in relation to the environmental characteristics, to provide optimum values for the attitude, immersion and position of the craft, for the tension and configuration of the pipe, for the length and pulls of cables and for the thrust of the propulsion means, and which plans the anchor weighing succession of the craft, said values being fed to a second computer to be transformed into control signals for the apparatus after comparing them with the actual values, in order to make any necessary correction to these latter; the first computer also receives from a second computer the variation in the parameters of the operation programmes due to varying conditions of the environment in which the craft operates;
(b) the second computer which combines the data concerning the bow direction, the radio navigation data and the satellite data with the doppler data and processes this data, and in addition adds the values of the previous combination to, and processes, the geometrical and tension values of the pipe being laid and of the anchor cables corrected by the values of the oscillations and displacements of the craft to give a greater accuracy to the position of the craft, and in addition determines and calculates the forces acting on the craft, the forces acting on the pipe and the pipe configuration, the sea depth, the forces induced by the pipe on the ramps, the forces exerted by the stinger on the external ramp, the forces induced by the pipe on the tensioning devices, the forces acting on the anchor cables and the cable configuration, the thrusts of the propulsion units and the attitude of the craft; in addition the second computer proportions the forces, by means of automatic, semi-automatic or manual control signals, to the tensioning devices, to the propulsion units and to the anchor winches in order to hold the craft in the programmed position; in addition it provides for the omissions in the apparatus and re-establishes their operational limits, all within the safety system which comprises sensor control, blocking the faulty apparatus, the minimum number of apparatus in operation, mutual control between the operator and computer, and the variation in the parameters of the operation programmes due to changes in the environmental characteristics, this variation, fed to the operator and to the first computer, occurring on three different lines, the first of which relates to the change in the gains in the winch and tensioning device control, the second relates to controlling the position of the craft, and the third relates to the different ways in which the pipe can be laid; and (c) a third computer which distributes the available power to all the apparatus in accordance with a scale of values which varies on the basis of requirements and priority, according to the type of operation to be carried out.

17. A pipelaying craft as claimed in claim 1, wherein the means for controlling the peak loads on the tensioning devices of the pipe being laid or on winches of anchor cables include a series of carriage apparatus operatively connected to the craft, each of which includes an inclinometer sensitive to the inclination of the carriage in a vertical plane, a gyroscope sensitive to the angular displacements of the carriage in a horizontal plane, and an accellerometer for measuring the displacements of the carriage in a horizontal plane, the first carriage apparatus of the series being provided with a pressure switch for measuring the depth of the sea at the point in which it is fitted.

18. In the method for controlling the peak loads on the tensioning devices of the pipe being laid and on winches of anchor cables for the craft according to claim 1, wherein the means for controlling the peak loads on the tensioning devices or the winches include a series of carriage apparatus operatively connected to the craft and fitted internally to the pipe or externally to the anchor cables, the steps of connecting the carriages together, through articulated joints, by rigid rods of known length, each of which is provided with an inclinometer, so that knowing the slope of the rigid rod and the distance between the two apparatus, the curvature pattern of the pipe and cables can be obtained by a series of determinations, said determinations being corrected for the displacements determined by the accelerometer, so as to obtain the variation of the curvatures and hence of the configuration of the pipe or cables with time; from the value of the parameters of said variation and the pull which the pipe or cables exert on the tensioning devices or winches, the parameters can be deduced which indicate the conditions under which peak loads can occur on the tensioning devices or winches, and all the members concerned are maintained in a condition of safety by controlling the winches or tensioning devices.

* * * * *